(12) United States Patent
Izatt et al.

(10) Patent No.: US 12,535,583 B2
(45) Date of Patent: Jan. 27, 2026

(54) 3D SENSING DEPTH CAMERA

(71) Applicant: DUKE UNIVERSITY, Durham, NC (US)

(72) Inventors: Joseph Izatt, Durham, NC (US); Ruobing Qian, Durham, NC (US); Kevin Zhou, Durham, NC (US)

(73) Assignee: DUKE UNIVERSITY, Durham, NC (US)

(*) Notice: Subject to any disclaimer, the term of this patent is extended or adjusted under 35 U.S.C. 154(b) by 1204 days.

(21) Appl. No.: 17/238,521

(22) Filed: Apr. 23, 2021

(65) Prior Publication Data

US 2021/0333396 A1 Oct. 28, 2021

Related U.S. Application Data

(60) Provisional application No. 63/014,319, filed on Apr. 23, 2020.

(51) Int. Cl.
| | |
|---|---|
| *G01S 17/42* | (2006.01) |
| *G01S 17/89* | (2020.01) |
| *G02B 5/18* | (2006.01) |
| *G02B 27/30* | (2006.01) |
| *G06T 5/20* | (2006.01) |

(Continued)

(52) U.S. Cl.
CPC .............. *G01S 17/42* (2013.01); *G01S 17/89* (2013.01); *G02B 5/1866* (2013.01); *G02B 27/30* (2013.01); *G06T 5/20* (2013.01); *G06T 5/70* (2024.01); *G06T 7/521* (2017.01); *G06T 2207/10028* (2013.01); *G06T 2207/20032* (2013.01)

(58) Field of Classification Search
None
See application file for complete search history.

(56) References Cited

U.S. PATENT DOCUMENTS 7,447,408 B2 * 11/2008 Bouma .............. G02B 6/03622
385/127
10,838,047 B2 11/2020 Chong
(Continued)

FOREIGN PATENT DOCUMENTS

WO WO-2015110250 A2 * 7/2015 ......... G01B 11/0675

OTHER PUBLICATIONS

Masayuki Okano et al. "Swept Source Lidar: simultaneous FMCW ranging and nonmechanical beam steering with a wideband swept source", Optics Express, Jul. 29, 2020, 18 pages, vol. 28, No. 16.

*Primary Examiner* — Hovhannes Baghdasaryan
(74) *Attorney, Agent, or Firm* — Talem IP Law, LLP

(57) ABSTRACT

A 3D sensing depth camera involves a time-frequency multiplexed frequency-modulated continuous wave (FMCW) LiDAR technique. A sample arm of such a system for 3D depth sensing includes a scanner for beam scanning in a first axis and a diffractive optical element for spectrally encoded scanning along a second axis. The sample arm can further include beam shaping optics such as a collimator and a lens. Processing of an interferogram comprising depth information at a different position along the second axis for each frequency sweep of the light source involves applying a windowed spectral estimator at a particular spectral window size with zero-padding and according to a specified lateral sampling approach.

18 Claims, 28 Drawing Sheets

(51) Int. Cl.
   *G06T 5/70*   (2024.01)
   *G06T 7/521*  (2017.01)

(56) References Cited

U.S. PATENT DOCUMENTS

| | | | |
|---|---|---|---|
| 2006/0125682 A1* | 6/2006 | Kelly, Jr. | G01S 13/931 342/134 |
| 2009/0021801 A1* | 1/2009 | Ishihara | G02B 27/48 358/475 |
| 2019/0317194 A1 | 10/2019 | Chong | |

* cited by examiner

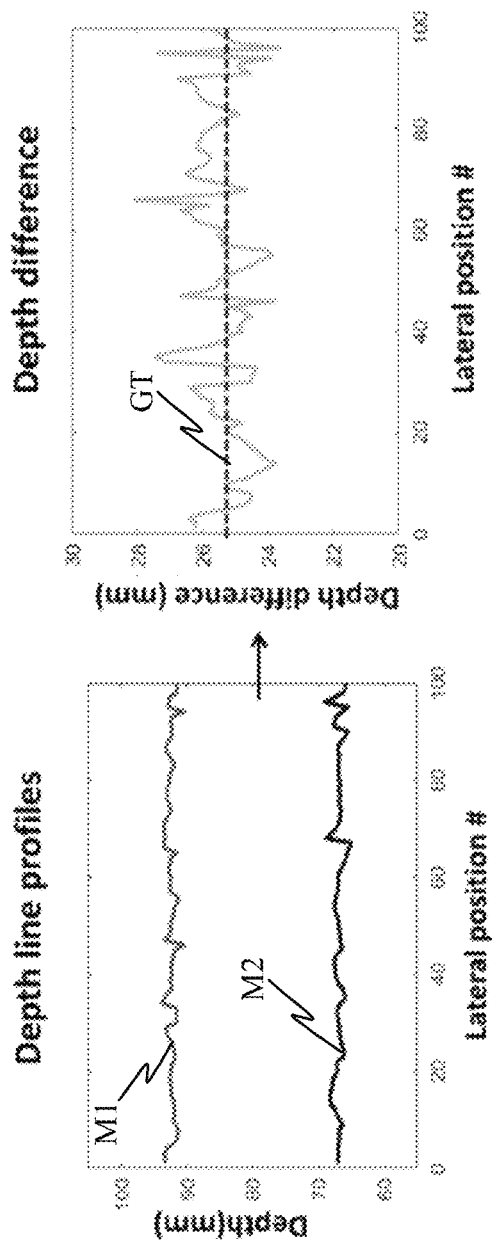

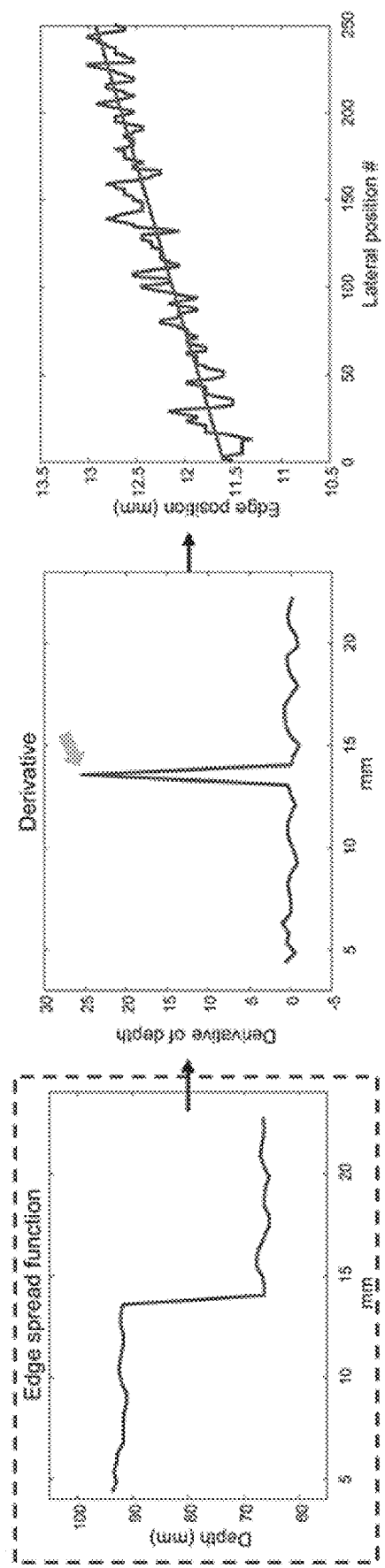

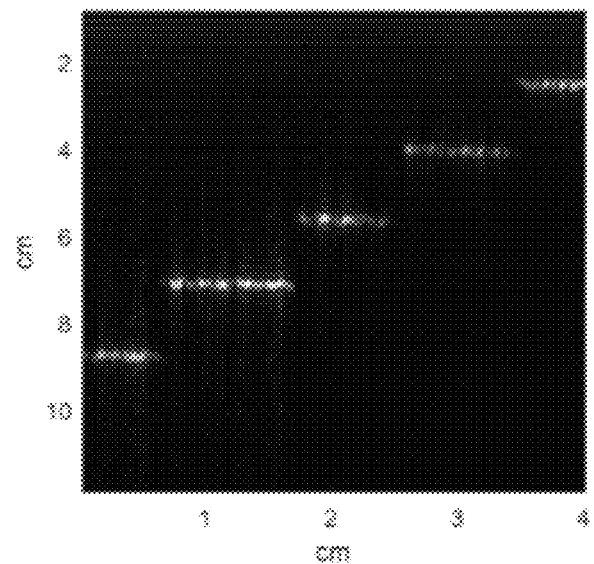 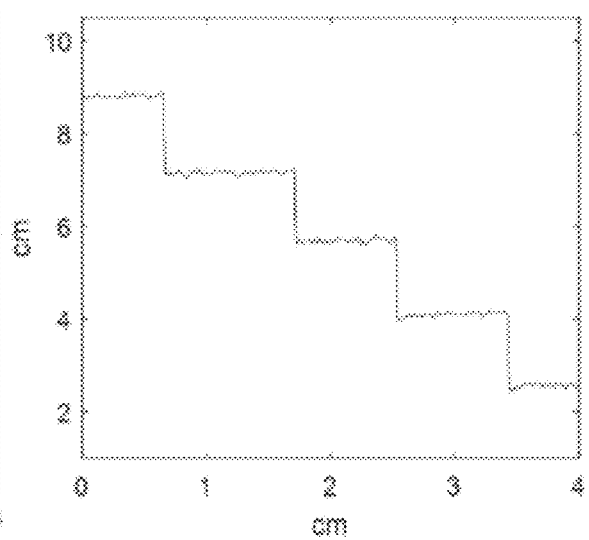
FIG. 26A                              FIG. 26B
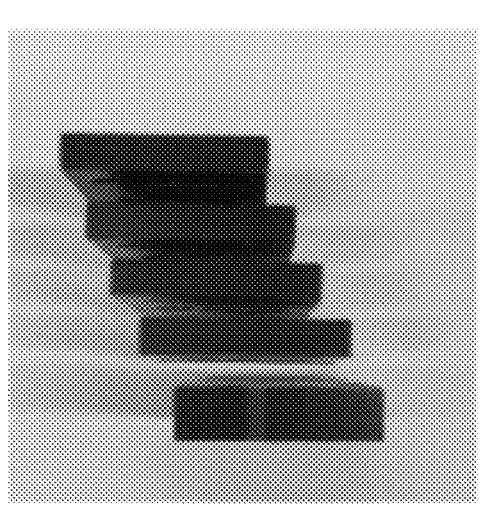 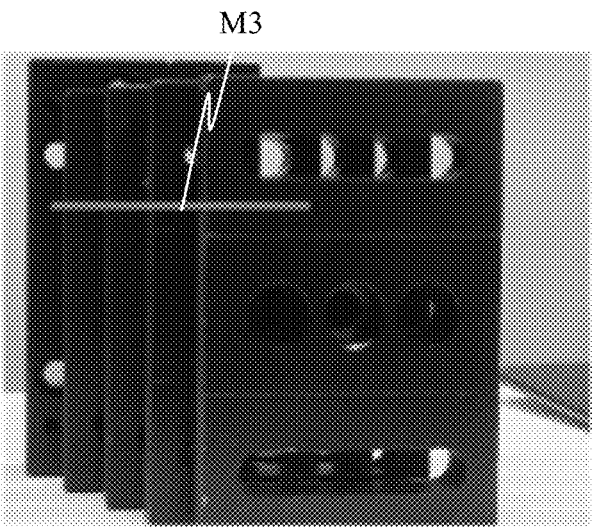
FIG. 26C                              FIG. 26D

3D SENSING DEPTH CAMERA

CROSS-REFERENCE TO RELATED APPLICATIONS

The present invention claims the benefit of U.S. Provisional Application Ser. No. 63/014,319, filed Apr. 23, 2020.

STATEMENT REGARDING FEDERALLY SPONSORED RESEARCH

This invention was made with government support under U01EY028079 awarded by the National Institutes of Health. The government has certain rights in the invention.

BACKGROUND

Real-time high-resolution three-dimensional (3D) imaging is highly desirable in a wide range of established and emerging fields including biomedical imaging, robotics, virtual/augmented reality, 3D printing, and autonomous vehicles. A useful distinction can be made between 3D volumetric imaging systems which acquire fully sampled 3D tomographic data, versus 3D surface imaging or ranging systems which detect the depth range for every pixel in a 2D scene. The former are commonly used in medical imaging, whereas the latter, often collectively referred to as light detection and ranging (LiDAR), are of intense current interest primarily motivated by autonomous systems development.

BRIEF SUMMARY

The Summary is provided to introduce a selection of concepts that are further described below in the Detailed Description. This Summary is not intended to identify key or essential features of the claimed subject matter, nor is it intended to be used as an aid in limiting the scope of the claimed subject matter.

A 3D sensing depth camera involves a time-frequency multiplexed frequency-modulated continuous wave (FMCW) light detection and ranging (LiDAR) technique for high-speed high-precision 3D imaging using a swept source, a diffractive optical element for fast-axis beam steering, and a compressed sampling approach.

A system for 3D depth sensing includes a light source for emitting light that is swept across frequencies from a first frequency to a last frequency; a beam splitter system that splits the light source into at least a reference beam and a sample beam; a detector that collects an interference signal between light returning from the reference beam and the sample beam, the interference signal forming an interferogram; a sample arm for the sample beam, the sample arm comprising a scanner for beam scanning in a first axis, and a diffractive optical element for spectrally encoded scanning along a second axis, wherein for each spectral window of the light source, the interferogram comprises depth information at a different position along the second axis; and a processing system coupled to the detector for generating a depth map.

The sample arm can further include beam shaping optics, such as a collimator and lens. The collimator can collimate a received sample beam from a light source and the lens can collimate or focus the collimated sample beam prior to or from the scanner. The arrangement and selection of the beam shaping optics, the scanner for beam scanning in the first axis, and the diffractive optical element are configured to direct the light comprising each spectral window of the light source on or within a diameter of a single Airy disk.

The processing system can include a hardware processor and a memory storing instructions that when executed by the hardware processor direct the processing system to: receive the interferogram of each frequency sweep of the light source from the detector; for each interferogram, apply a windowed spectral estimator (e.g. a short-time Fourier transform (STFT)) at a particular spectral window size with zero-padding and according to a specified lateral sampling approach by: sampling the interferogram according to the specified lateral sampling approach; and for each spectral window sample of the interferogram, applying zero-padding to a particular number of samples and applying a spectral estimator to the zero-padded spectral window sample to generate a signal for a pixel; performing peak localization analysis on the signal to identify a dominant peak; and if the dominant peak is identified, assigning a depth value according to the dominant peak intensity for the pixel, otherwise, assigning the pixel as a background; and provide a depth map of the pixels comprising the assigned depth values. The receiving of the interferogram, sampling the interferogram, and processing of each sample are repeated for all scans by the sample arm and corresponding frequency sweeps of the light source such that the depth map of the pixels with assigned values can be generated.

Accordingly, a method for generating a depth map can include receiving an interferogram; sampling the interferogram according to a specified lateral sampling approach to obtain a spectral window sample; and for each spectral window sample of the interferogram, applying zero-padding to a particular number of samples, applying a spectral estimator to the zero-padded spectral window sample to generate a signal for a pixel; performing peak localization analysis on the signal to identify a dominant peak; and assigning a depth value according to a an intensity of the dominant peak for the pixel based on the peak localization analysis.

DETAILED DESCRIPTION

The accompanying Figures are provided by way of illustration and not by way of limitation. The foregoing aspects and other features of the disclosure are explained in the following description, taken in connection with the accompanying example figures (also "FIG.") relating to one or more embodiments, in which:

FIGS. 10A and 10B show plots of depth profiles and a difference profile, respectively, of the two staggered metal base plates.

FIGS. 12A-12C illustrate lateral localization precision. FIG. 12A shows a plot of an edge response function; FIG. 12B shows a depth range measurement; and FIG. 12C shows a plot representing horizontal localization precision.

Figure 13:
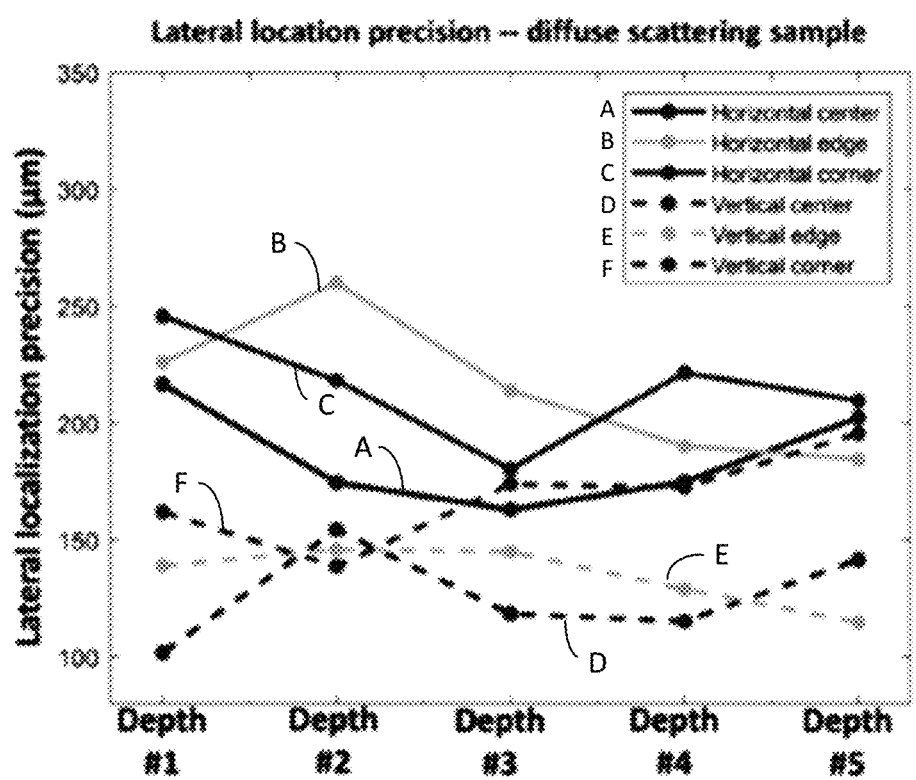

FIG. 13 shows a plot illustrating lateral localization precision on a diffuse scattering sample.

FIGS. 14A-14D illustrate an experiment in which two ceramic coffee cups are imaged.

FIGS. 15A-15D illustrate an experiment in which a synthetic rubber mannequin head was imaged.

Figure 16:
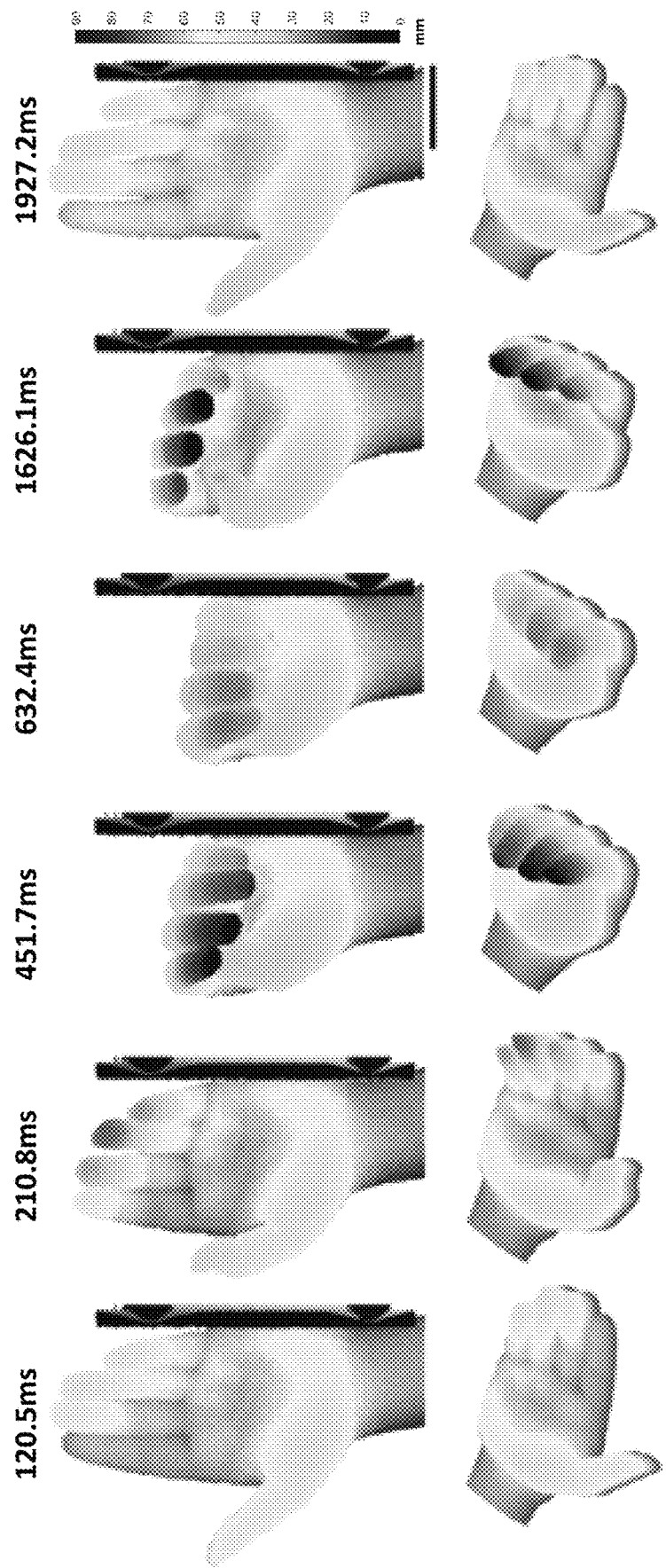

FIG. 16 illustrates an experiment in which a moving hand is imaged.

Figure 17:
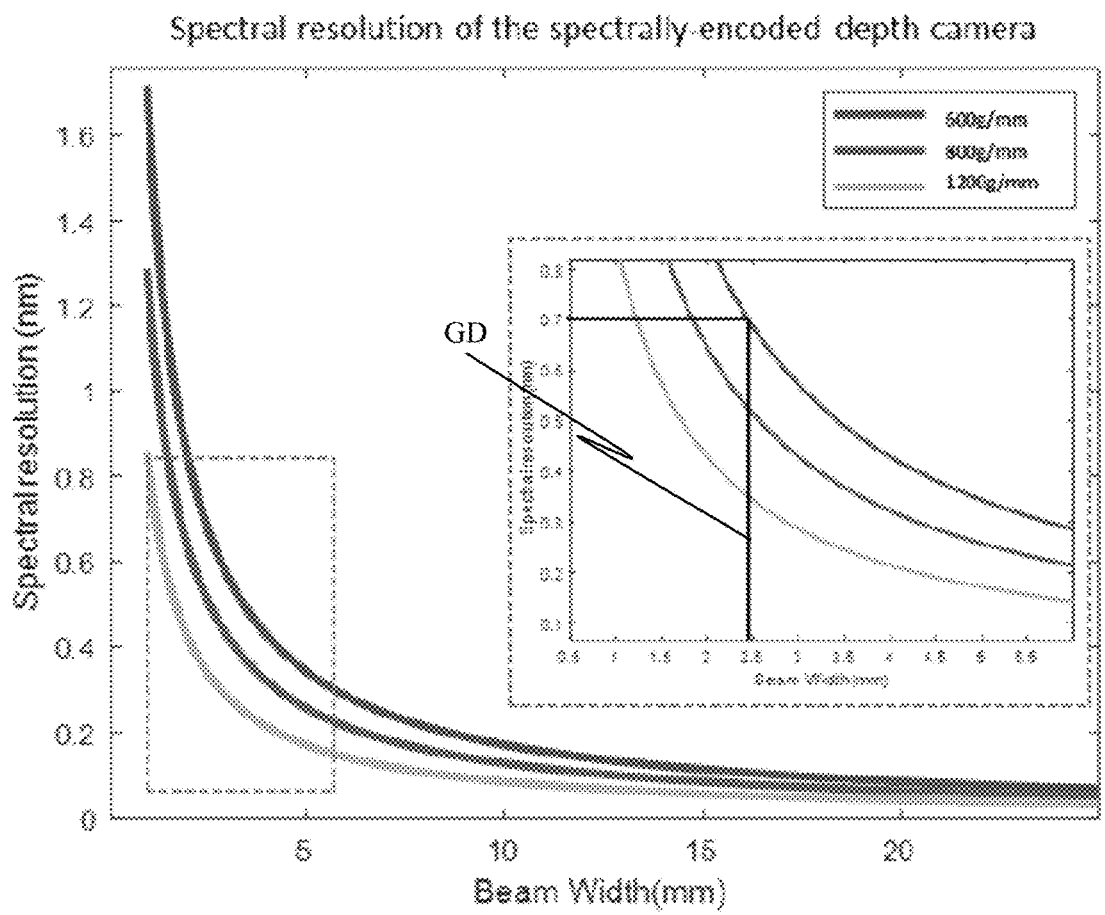

FIG. 17 shows a plot of spectral resolution of the time-frequency multiplexed 3D camera as a function of the input beam width.

Figure 18:
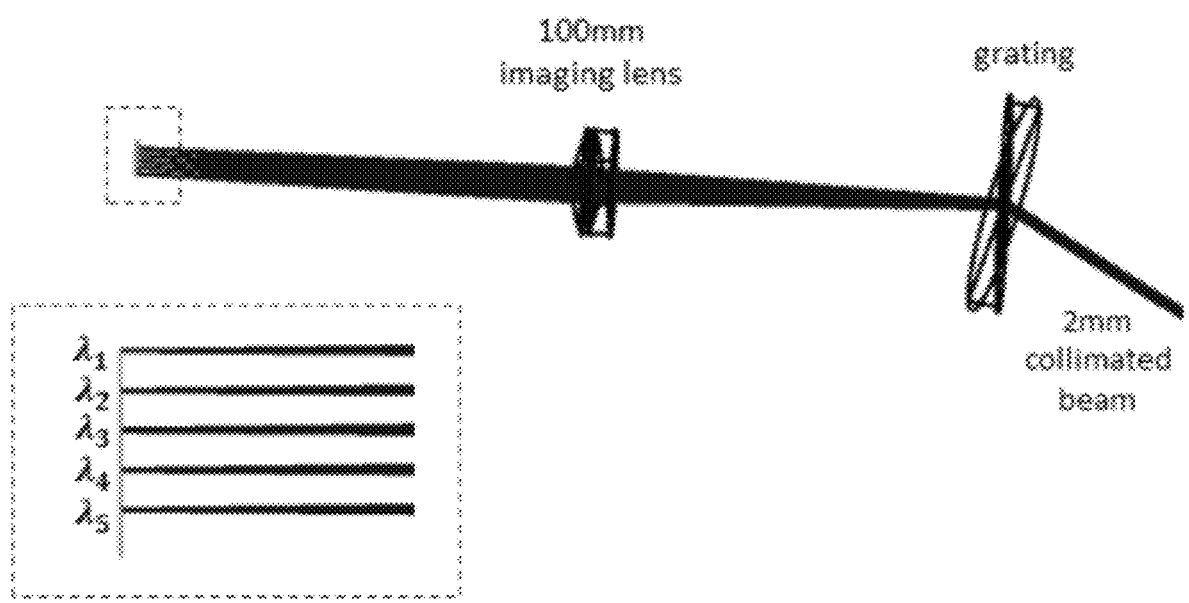

FIG. 18 shows a design of time-frequency multiplexed 3D camera with a zoom-in view of the imaging plane where different wavelengths of a single sweep were distributed to the different lateral location along one axis.

Figure 19:
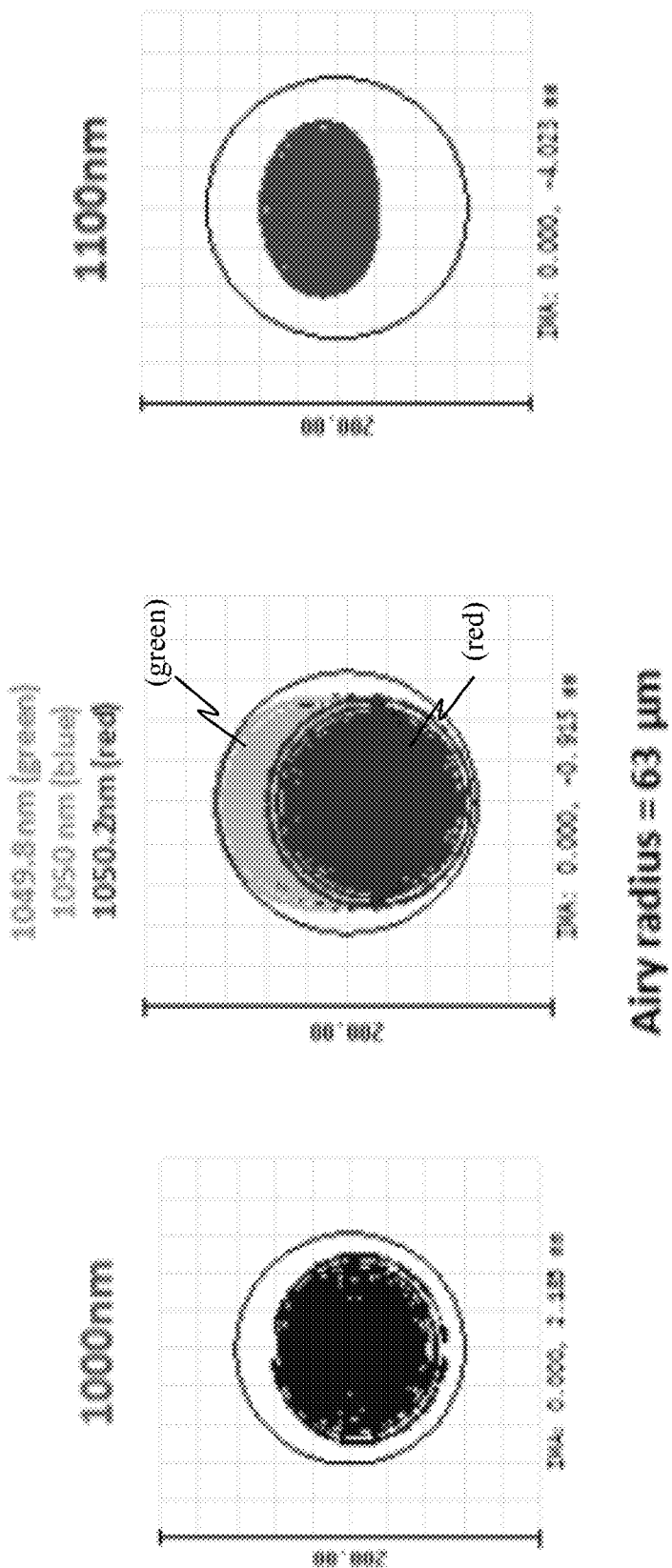

FIG. 19 shows spot diagrams for a prototype using a conventional OCT swept source.

Figure 20A:
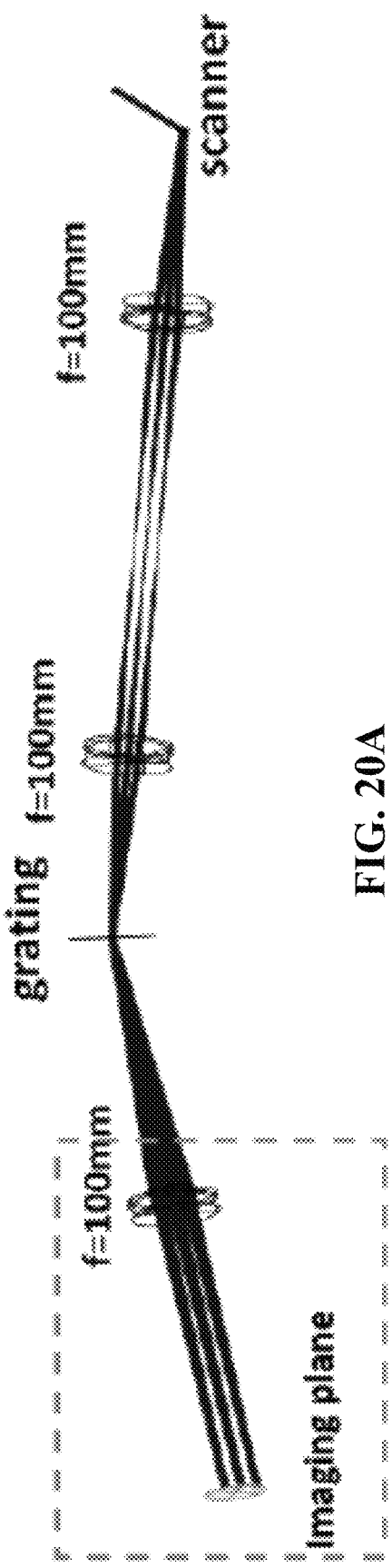

FIG. 20A shows a design of the time-frequency multiplexed 3D camera using the diffraction grating for fast-axis scanning and the galvanometer mirror for slow-axis scanning.

Figure 20B:
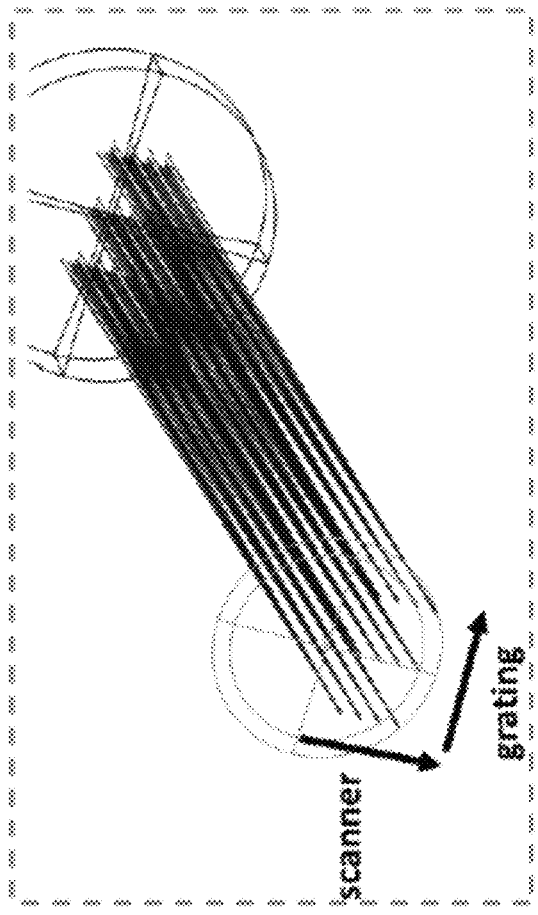

FIG. 20B shows a zoom-in view of the imaging plane for FIG. 20A.

Figures 21A, 21B, 21C:
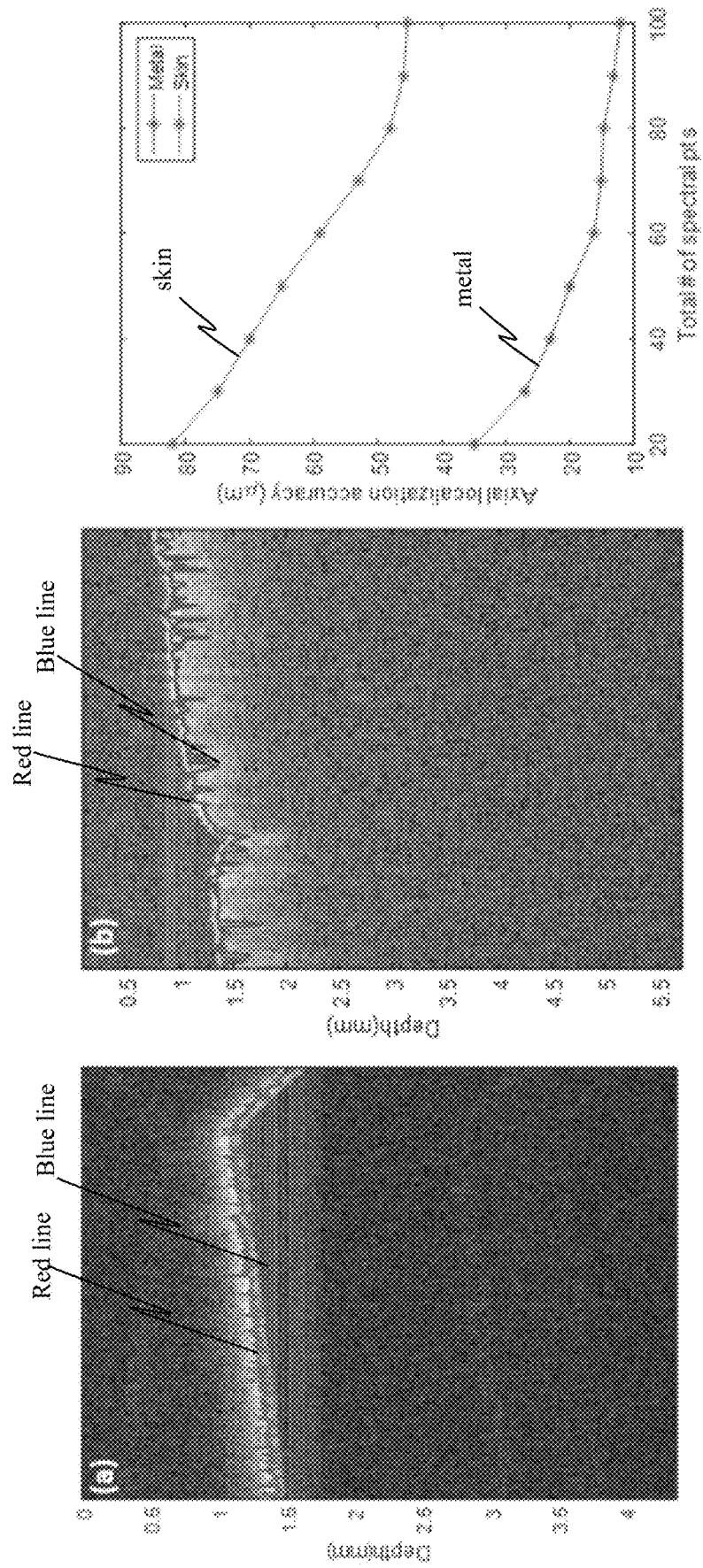

FIGS. 21A-21C illustrate an experiment using the conventional OCT swept source on a metal piece and human skin.

FIGS. 22A-22D illustrate an experiment using the conventional OCT swept source on a metal piece.

Figure 23:
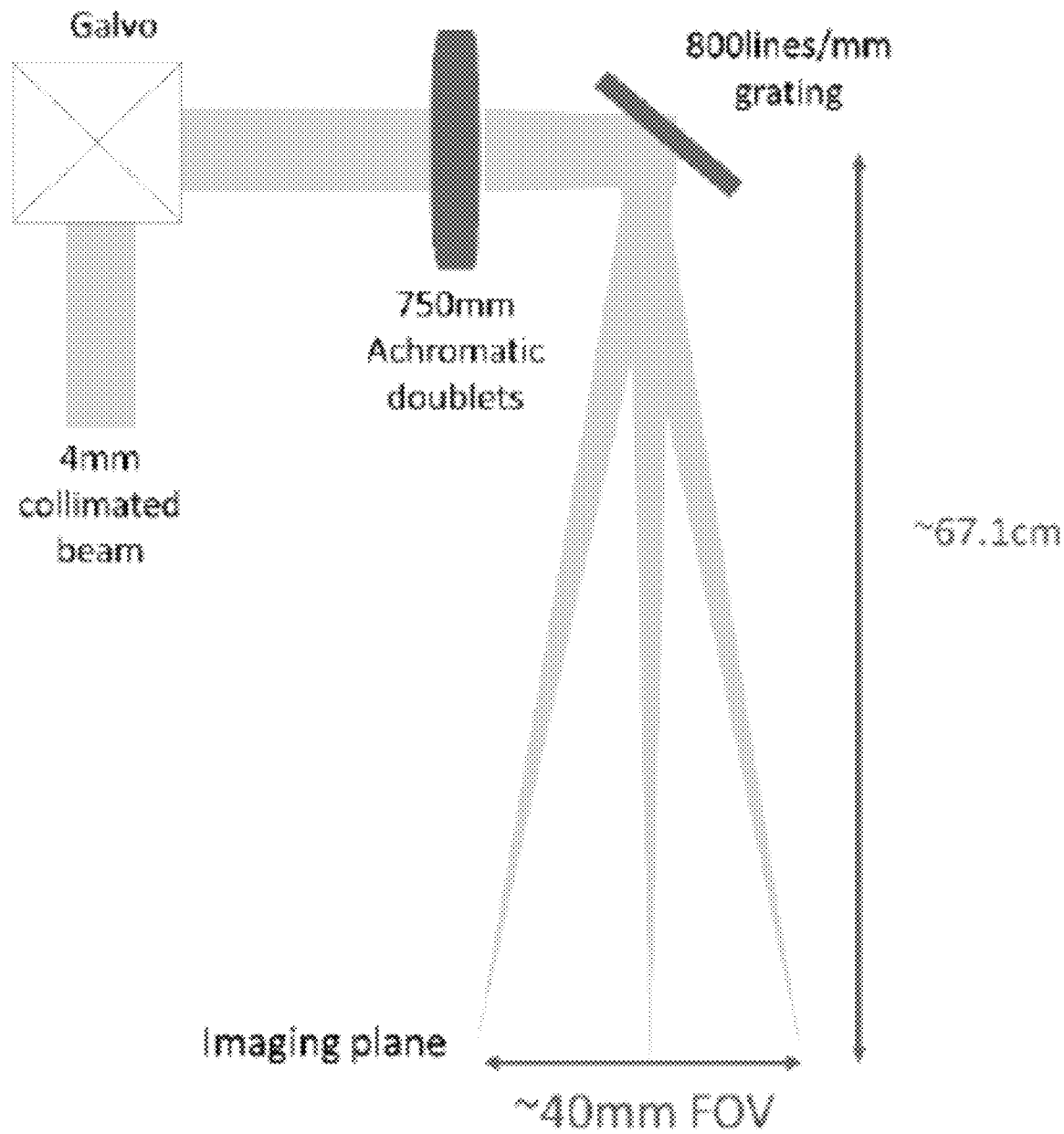

FIG. 23 illustrates a schematic of an example sample arm optical design for a prototype using a long coherence length swept source.

Figure 24:
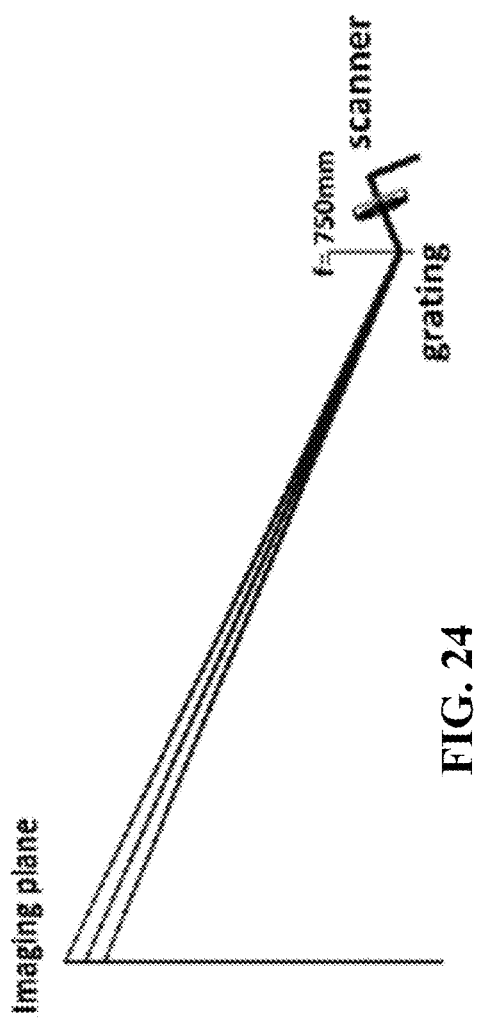

FIG. 24 shows representative details of a design of FIG. 23.

Figure 25:
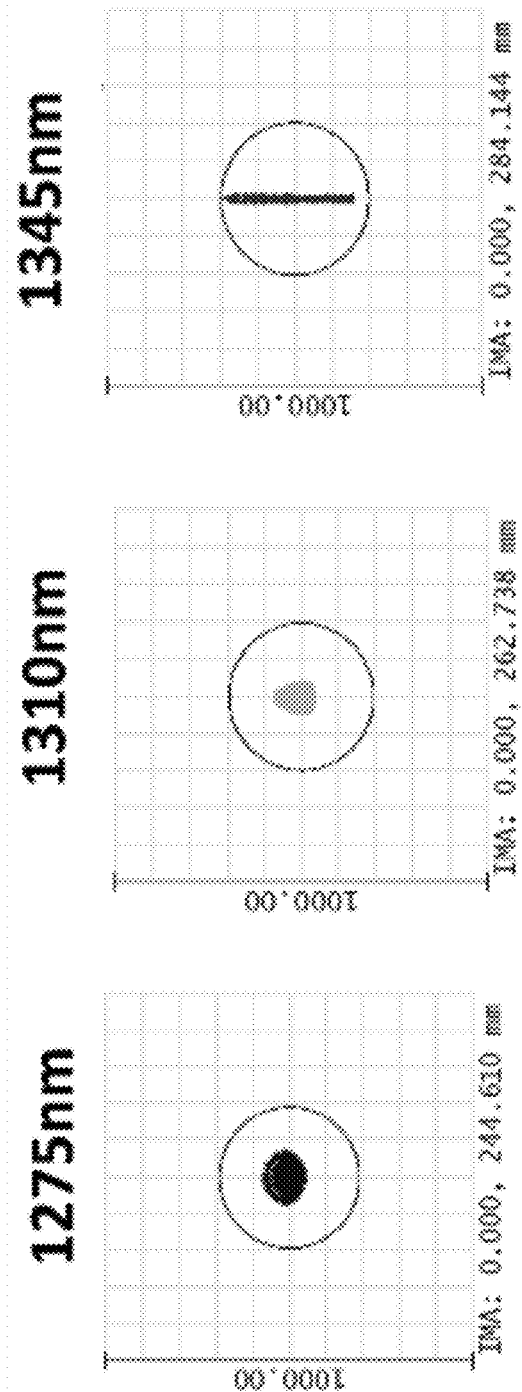

FIG. 25 shows spot diagrams of the prototype using a long coherence length swept source.

FIGS. 26A-26D illustrate an experiment in which a stack of five metal pieces is imaged.

FIGS. 27A-27D illustrate an experiment in which a cage plate is imaged.

FIGS. 28A-28D illustrate an experiment in which a model airplane is imaged.

FIGS. 29A-29D illustrate an experiment in which a Japanese ceramic cat coin bank is imaged.

DETAILED DESCRIPTION

A 3D sensing depth camera involves a time-frequency multiplexed frequency-modulated continuous wave (FMCW) light detection and ranging (LiDAR) technique for high-speed high-precision 3D imaging using a swept source, a diffractive optical element for fast-axis beam steering, and a compressed sampling approach. Advantageously, it is possible to achieve high speed, high resolution 3D imaging of at least 30 Hz and submillimeter depth localization accuracy.

Figure 1:
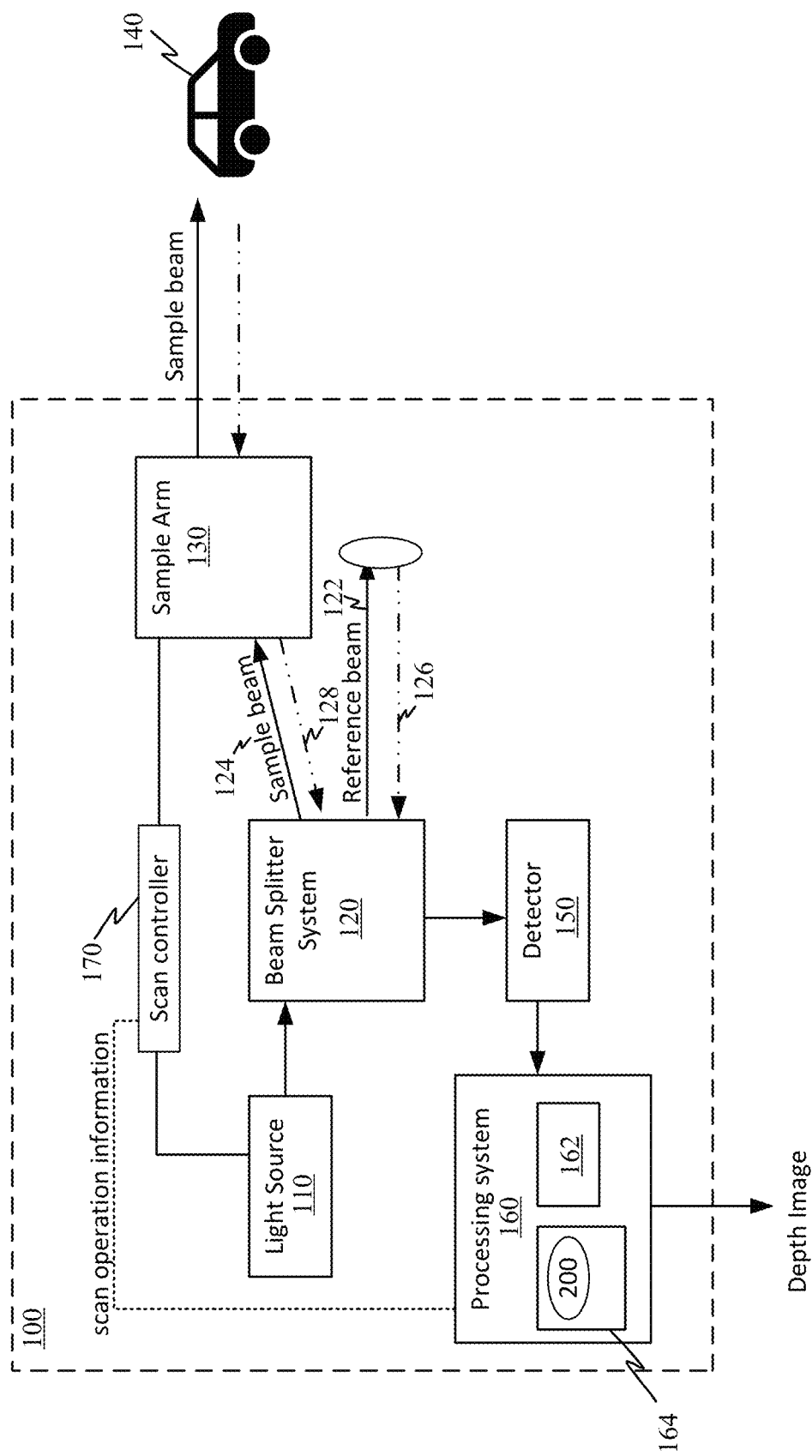
FIG. 1 illustrates a system for 3D depth sensing.

FIG. 1 illustrates a system for 3D depth sensing. Referring to FIG. 1, a system 100 for 3D depth sensing can include a light source 110 for emitting light that is swept across frequencies from a first frequency to a last frequency. A coherent light source can be used. The sweeping of the frequencies may be repeated during operation of the system 100. Any light source having sufficient bandwidth for sweeping across frequencies may be used. For example, the light source 110 can be a broadband light source in the form of an akinetic swept laser. In some cases, a laser having a central wavelength of around 1310 nm is used (e.g., within expected temperature, voltage, and process variations). In some cases, a light source having a central wavelength of around 1050 nm is used (e.g., within expected temperature, voltage, and process variations).

Figure 4:
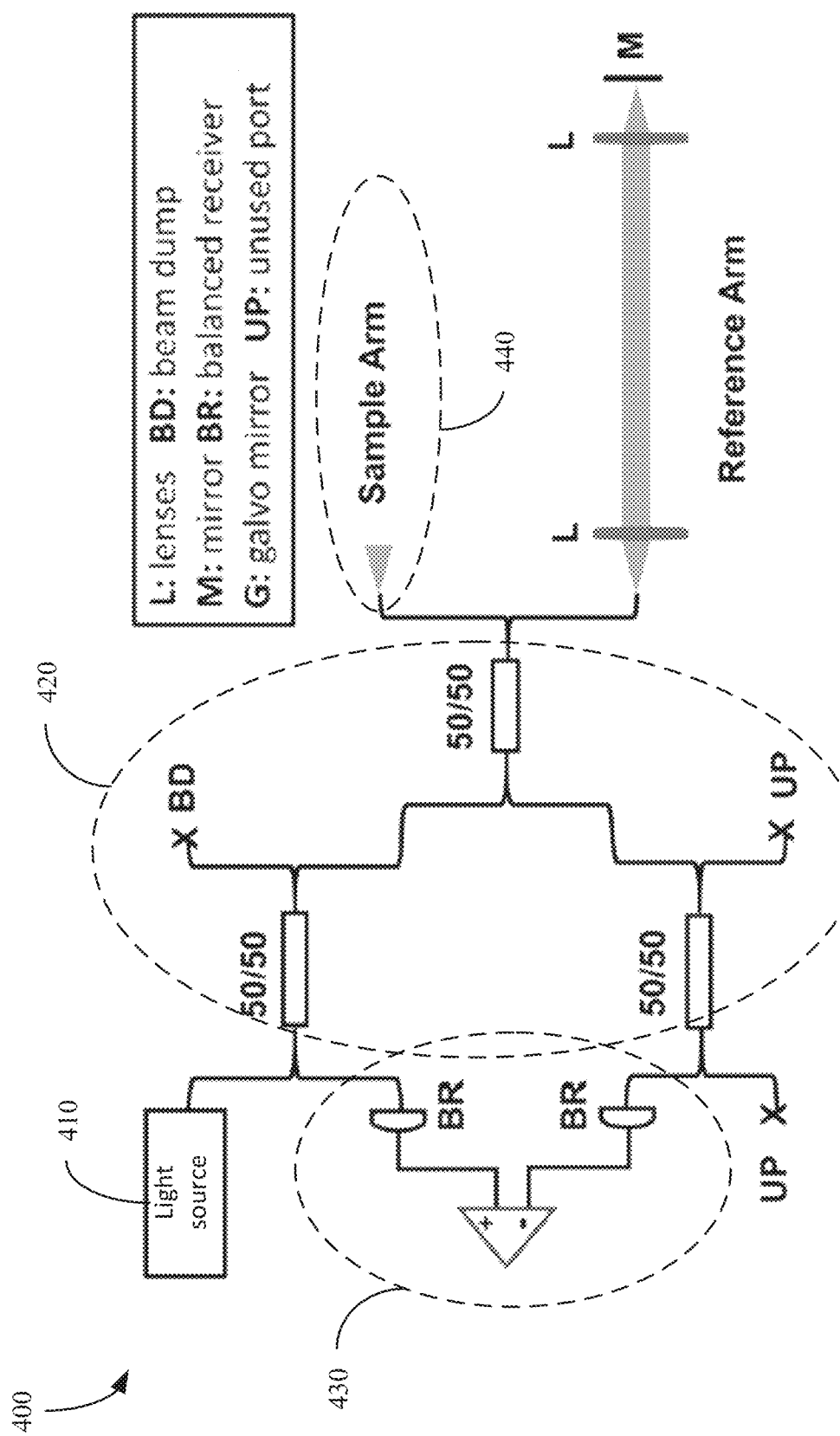
FIG. 4 is a schematic of an example system for 3D depth sensing.

System 100 further includes a beam splitter system 120 that splits the light from the light source 110 into at least a reference beam 122 and a sample beam 124 and returns a return reference beam 126 and a return sample beam 128 (i.e., the light returning from the reference beam 122 and the sample beam 124). The beam splitter system 120 can include one or more beam splitters. For example, as illustrated in the example of FIG. 4, three beam splitters may be used as part of a beam splitter system. Optical fibers can also be used. A sample arm 130 receives the sample beam 124 from the beam splitter system 120 in order to scan an area for 3D depth sensing of objects, such as object 140, in the area. In order to improve speed and resolution of the 3D depth sensing, the sample arm 130 of the system includes a scanner for beam scanning in a first axis and a diffractive optical element for spectrally encoded scanning along a second axis.

A detector 150 is coupled to the beam splitter system 120 to collect an interference signal from the return reference beam 126 and the return sample beam 128. That is, the detector collects an interference signal between light returning from the reference beam and the sample beam.

The interference signal collected by the detector 150 forms an interferogram used by a processing system 160 coupled to the detector 150. The processing system 160 includes a hardware processor 162 and memory 164 that stores instructions that when executed by the hardware processor 162 direct the processing system 160 to generate a depth map by, for each interferogram received from the detector, applying a windowed spectral estimator (e.g., STFT) at a particular spectral window size with zero-padding and according to a specified lateral sampling approach. This process can be accomplished according to method 200 as described with respect to FIG. 2A.

System 100 can also include a scan controller 170. The scan controller can be coupled to the light source 110 and/or the sample arm 130 to coordinate the operation of the sample arm with the sweeping frequencies of the light source. In some cases, scan operation information from the scan controller can be provided to the processing system 160 prior to or during image capture to facilitate identification of corresponding pixel locations (or at least first axis positions).

Figure 2A:
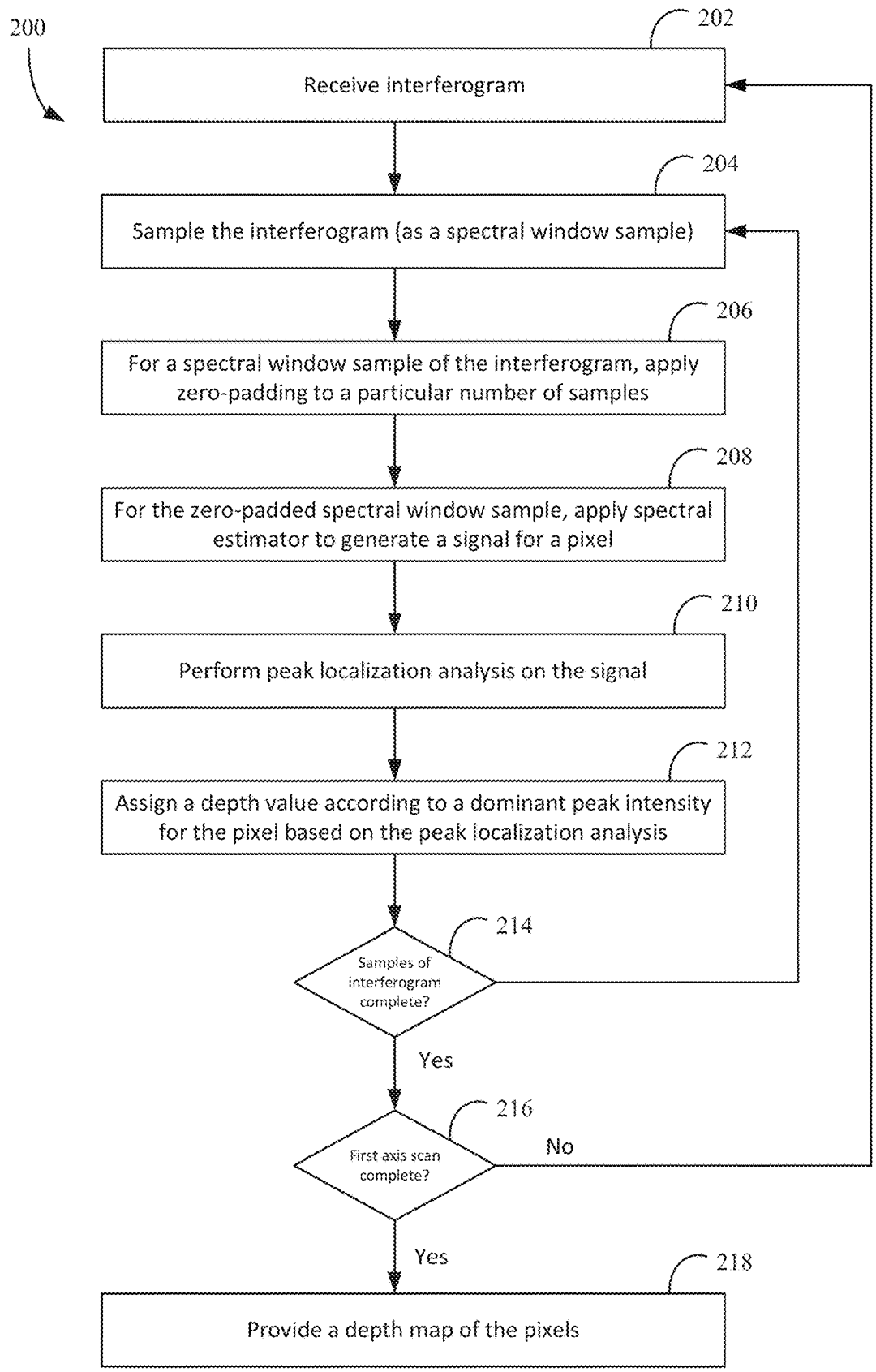
FIG. 2A illustrates a method of generating a depth map.

FIG. 2A illustrates a method of generating a depth map. Referring to FIG. 2A, method 200 of generating a depth map can include receiving (202) the interferogram of each frequency sweep from the detector; and sampling (204) the interferogram according to a specified lateral sampling approach (where the sample is a spectral window sample). The spectral window size of the spectral window sample can be between 0.01 nm and 1.0 nm. Method 200 further includes, for a spectral window sample of the interferogram, applying zero-padding (206) to a particular number of samples, applying a spectral estimator (208) to the zero-padded spectral window sample to generate a signal for a pixel; performing peak localization analysis (210) on the signal to identify a dominant peak, and assigning a depth value (212) according to a dominant peak intensity for the pixel based on the peak localization analysis. The dominant peak can be identified (e.g., in operation 210) as a highest peak above a predetermined threshold (e.g., a predetermined intensity value). When assigning the depth value according to the dominant peak intensity (e.g., operation 212), if the dominant peak is identified, the method includes assigning a depth value according to a corresponding depth position of the dominant peak for the pixel, otherwise, the pixel is assigned as a background. The particular number of samples for the zero-padding can be between 1000-10,000 samples; however, more or fewer samples for the zero-padding may be used. In some cases, the spectral estimator is a Fourier transform.

These processes of applying zero-padding (206), applying a spectral estimator (208), performing peak localization analysis (210), and assigning a depth value (212) are repeated for each sample of the interferogram (e.g., according to decision 214). The receiving (202) of the interferogram, sampling (204) the interferogram, and processes 206, 208, 210, 212 are repeated for all scans by the sample arm and corresponding frequency sweeps of the light source (e.g., according to decision 216). A depth map of the pixels with values generated as described can be provided (218). The information from the depth map may be used in autonomous vehicle/robot motion planning systems, augmented/virtual reality systems, or even provided for display.

Figure 2B:
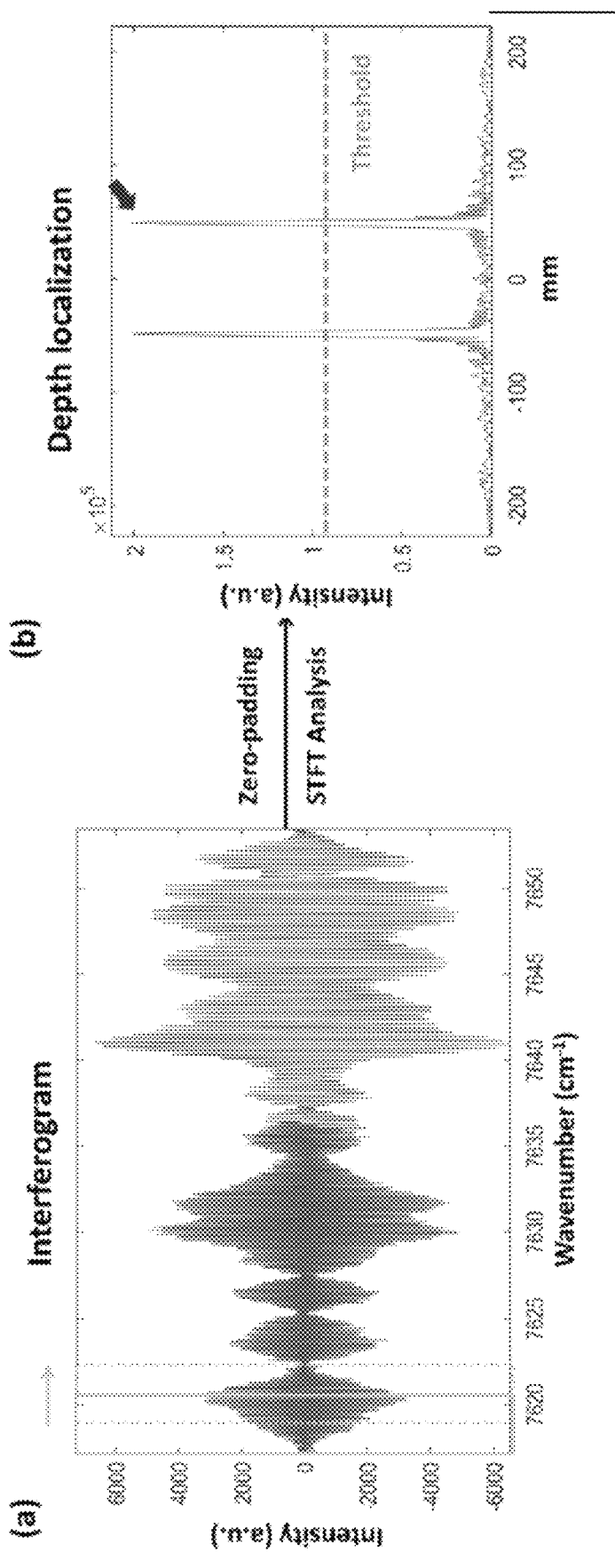
FIG. 2B illustrates the processing of an interferogram.

FIG. 2B illustrates the processing of an interferogram. Referring to FIG. 2B, an interferogram collected by a detector (e.g., detector 150 of FIG. 1, detector 430 of FIG. 4) With a diffractive optical element (e.g., diffractive optical element 340 of FIG. 3A, grating 540 of FIG. 5) used for fast spectral scanning, the detected interferogram during a single frequency sweep contains the signals from reflectors at different positions along the second axis (e.g., lateral positions when the second axis is horizontal; vertical positions when the second axis is vertical). To retrieve the depth information of reflectors, instead of Fourier transforming (or performing some other spectral estimation on) the entire interferogram, an STFT (or other windowed spectral estimation) is applied. The spectral window size of the STFT determines the tradeoff between the angular/lateral resolution and axial resolution. In some cases, the spectral window size is between 0.01 nm and 1.0 nm in wavelength, a lateral resolution along the second axis is between 0.1 mm and 10 mm and a lateral resolution along the first axis is between 0.1 mm and 10 mm. A larger spectral window corresponds to a larger bandwidth, which leads to better axial resolution or localization accuracy, but fewer total number of windows, which leads to lower effective lateral resolution along the grating axis. Accordingly, the optimal spectral window size can be determined based on the second-axis resolution of the system. The result of the STFT with zero-padding is shown in the box (b), from which depth localization can be determined by peak localization analysis.

Figure 3B:
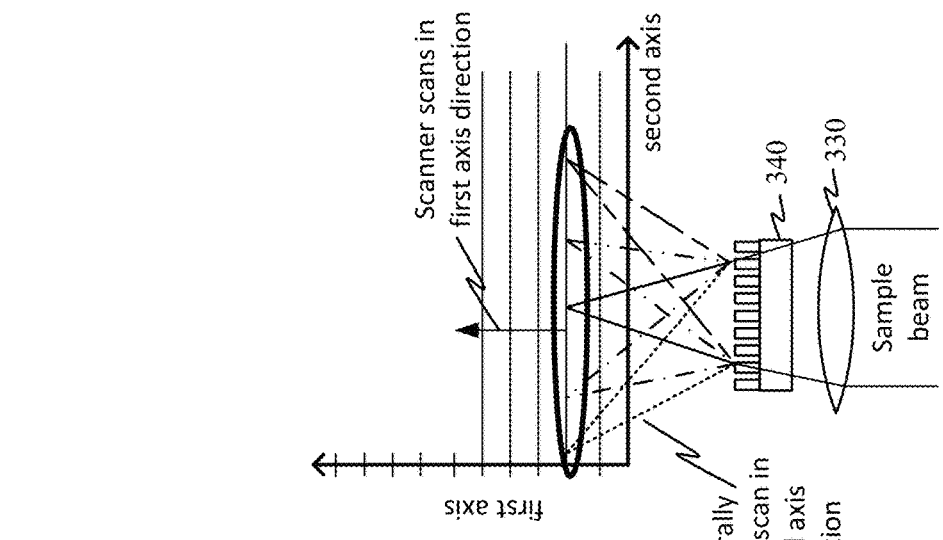
FIG. 3B illustrates scanning operation of a sample arm for a system for 3D depth sensing.
Figure 3A:
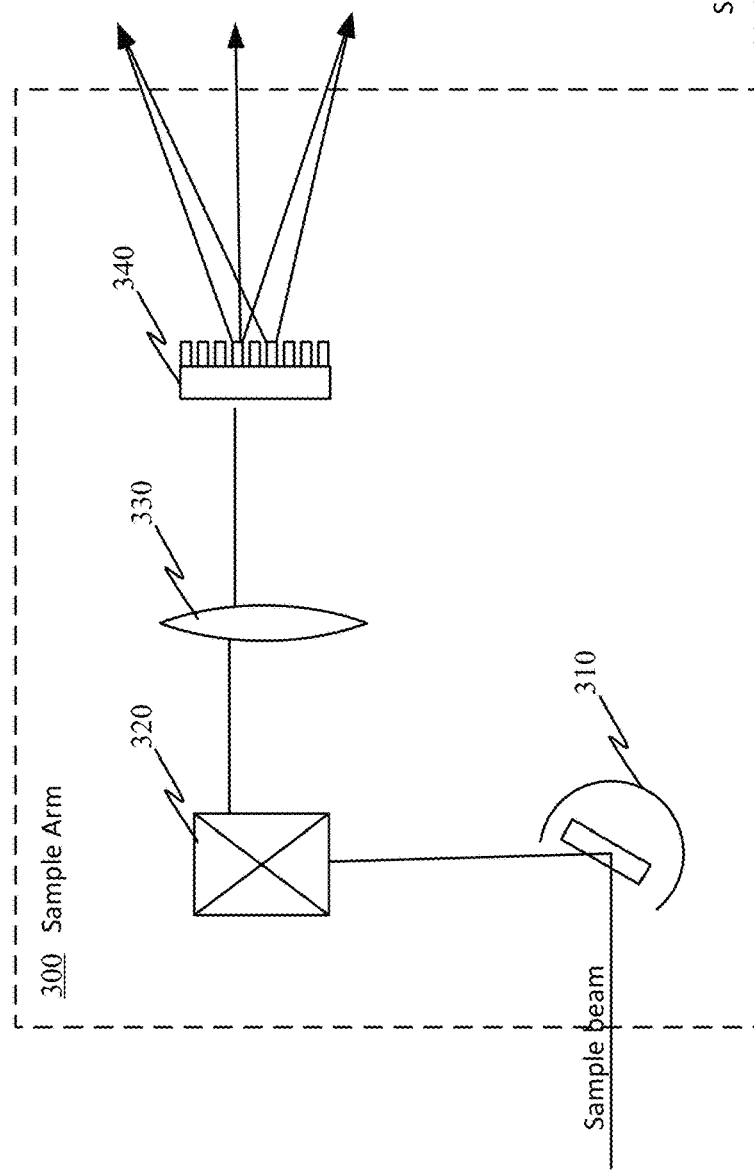
FIG. 3A illustrates an example sample arm with beam shaping optics for a system for 3D depth sensing.

FIG. 3A illustrates an example sample arm with beam shaping optics for a system for 3D depth sensing; and FIG. 3B illustrates scanning operation of a sample arm for a system for 3D depth sensing. In the illustrated example, the beam shaping optics included in the sample arm are a collimator and a lens. However, embodiments are not limited thereto. Referring to FIG. 3A, a sample arm 300 can include a collimator 310 (a reflective collimator shown), a scanner 320 for beam scanning in a first axis (e.g., vertical axis), a lens 330, and a diffractive optical element 340 for spectrally encoded scanning along a second axis (e.g., horizontal axis). The sample arm 300 can receive the sample beam from a beam splitter system (e.g., as described with respect to sample arm 130 of FIG. 1), collimates the sample beam via the collimator 310, which directs the sample beam to the scanner 320, which can be a galvanometer mirror. For each frequency sweep of the light source (e.g., from a light source such as light source 110 of FIG. 1), the sample arm 300 scans the sample beam in the first axis using the scanner 320 and performs a spectrally encoded scan along the second axis via the diffractive optical element 340, which can be a transmissive grating. The lens 330 can collimate or focus the light from the scanner 320 to the diffractive optical element 340. It should be understood that although the lens 330 is shown throughout the figures as between the scanner 320 and the diffractive optical element 340, in some implementations, the lens 330 may be located before the scanner 320 for focusing the collimated light from the collimator 310 to the scanner 320 and in some other implementations, the lens 330 may be located after the diffractive optical element 340.

FIG. 3B illustrates a set of scanning beams at different frequencies along the second axis for a particular setting on the first axis. As can be seen, a sample beam is distributed for spectral encoding in the second axis direction. Each beam corresponds to each frequency of the frequency sweep of the light source. This spectrally encoded scan repeats as the scanner scans in the first axis direction. As mentioned above, although the sample beam is shown passing through a lens 330 before the diffractive optical element 340, embodiments are not limited thereto (e.g., lens 330 can be disposed after the diffractive optical element 340 and even before the scanner 320).

FIG. 4 is a schematic of an example system for 3D depth sensing. Referring to FIG. 4, an example system 400 can include a light source 410, a beam splitter system 420, a detector 430, and a sample arm 440. System 400 utilizes a time-frequency multiplexed Frequency-modulated continuous wave (FMCW) LiDAR technique for 3D depth sensing for high-speed high-precision 3D imaging. Here, the light source 410 is a laser and can be an akinetic all-semiconductor swept source. The beam splitter system 420 can be a spectrally balanced interferometer topology incorporating three 50/50 2*2 fiber couplers. The detector 430 can be a balanced photodetector. The sample arm 440 can be as described with respect to the sample arm 300 of FIG. 3A, an implementation of which is illustrated in FIG. 5.

Figure 5:
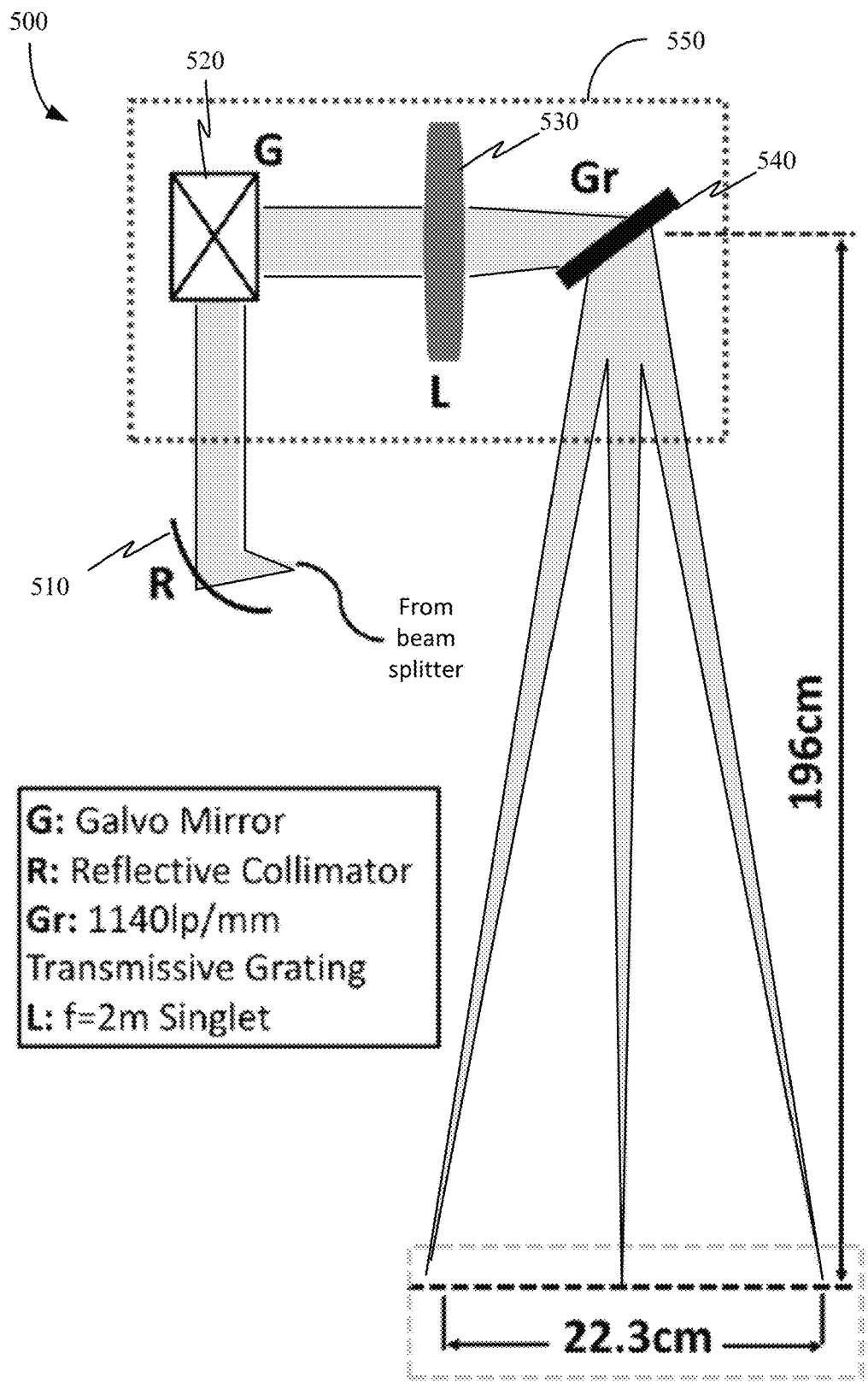
FIG. 5 illustrates a schematic of an example sample arm optical design.

FIG. 5 illustrates a schematic of an example sample arm optical design. Sample arm 500 may be used for the sample arm 440 of FIG. 4. Referring to FIG. 5, sample arm 500 includes a reflective collimator 510, a scanner 520 for beam scanning in a first axis (e.g., vertical axis), a lens 530, and a transmissive grating 540 for spectrally encoded scanning along a second axis (e.g., horizontal axis). Here, the scanner 520 is a galvanometer mirror. The sample arm 500 receives the sample beam from a beam splitter (e.g., beam splitter system 420 of FIG. 4). The beam reflects off of the reflective collimator 510 and is directed in the first axis by the galvanometer mirror 520 through the lens 530 to the transmissive grating 540 (galvanometer mirror 520, lens 530, and grating 540 collectively identified in the box 550).

Figure 6A:
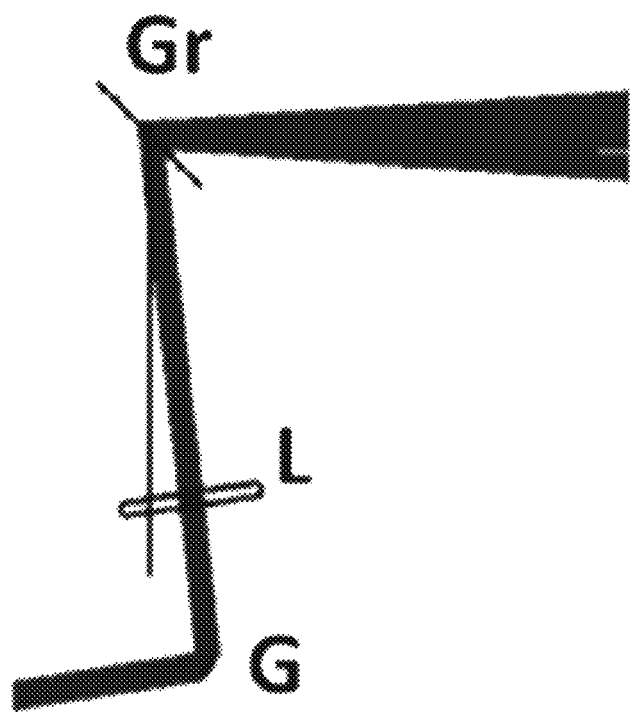
FIGS. 6A and 6B show representative details of the sample arm optical design of FIG. 5.
Figure 6B:
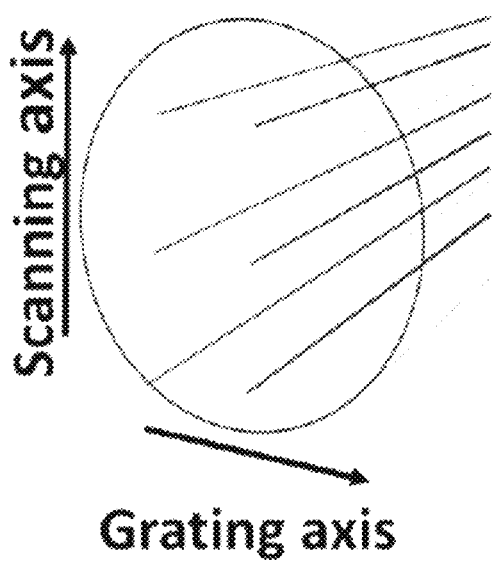

FIGS. 6A and 6B show representative details of the sample arm optical design of FIG. 5. Referring to FIG. 6A, a detail of box 550 is shown. In particular, the collimated light is shown impinging on the galvanometer mirror (G) to be directed through the lens (L), which focuses the light to the grating (Gr) for dispersing the light. As shown in FIG.

6B, the grating (Gr) disperses the light along one axis (the grating axis) while the galvanometer mirror (G) scans along another axis (the scanning axis).

Prototype Using Akinetic Swept Laser Source

A specific implementation for a prototype according to the design of FIGS. 4 and 5 used the following features. An akinetic all-semiconductor programmable swept laser source (Insight Photonics Solutions; Lafayette, CO) centered at 1316 nm with a 65.85 nm bandwidth was used as the light source 410. The source has an output power of ~70 mW and a nearly flat power spectrum across the entire bandwidth. The source also has an instantaneous coherence length of >1 m and a linearity ≤±0.5 μm root mean square without the need for an external kclock. The sweep rate of the laser can be adjusted from 10 kHz to 200 kHz, and for this application, the sweep rate of the laser was set at 15.94 kHz.

For the sample arm 440, 500, a 4 mm diameter collimated beam was created by a reflective collimator 510 (Thorlabs; Newton, NJ). The scanner 520 was galvanometer mirror (Thorlabs; Newton, NJ). The lens 530 was a 2 m focal length plano-convex lens 530 (Thorlabs; Newton, NJ). The grating 540 was a 1145 grooves/mm volume phase holographic transmissive grating (Wasatch Photonics; Logan, UT). The grating 540 was positioned with an incident angle of ~48° to maximize diffraction efficiency, and the input beam power after the grating was 15.2 mW. With the total sweep bandwidth of the input source of 65.85 nm, the angular FOV along the horizontal axis was 7.1°. With a working distance (from the grating to the focal plane) of 196 cm, the system thus achieved a horizontal FOV of 22.4 cm and diffraction limited performance with a lateral resolution of 890 μm at the focus (see e.g., FIG. 7 described below). The vertical FOV was determined purely by the scanning angle of the galvanometer mirror 520; a vertical FOV of 12-20 cm was used.

A balanced photodetector 430 with 400 MHz bandwidth and digitized at 800 MS/s was used such that a total of 47,646 samples could be collected per frequency sweep. The maximum imaging range of the prototype system was approximately 32 cm. Simulations and design were carried out using software by Zemax LLC.

Figure 7:
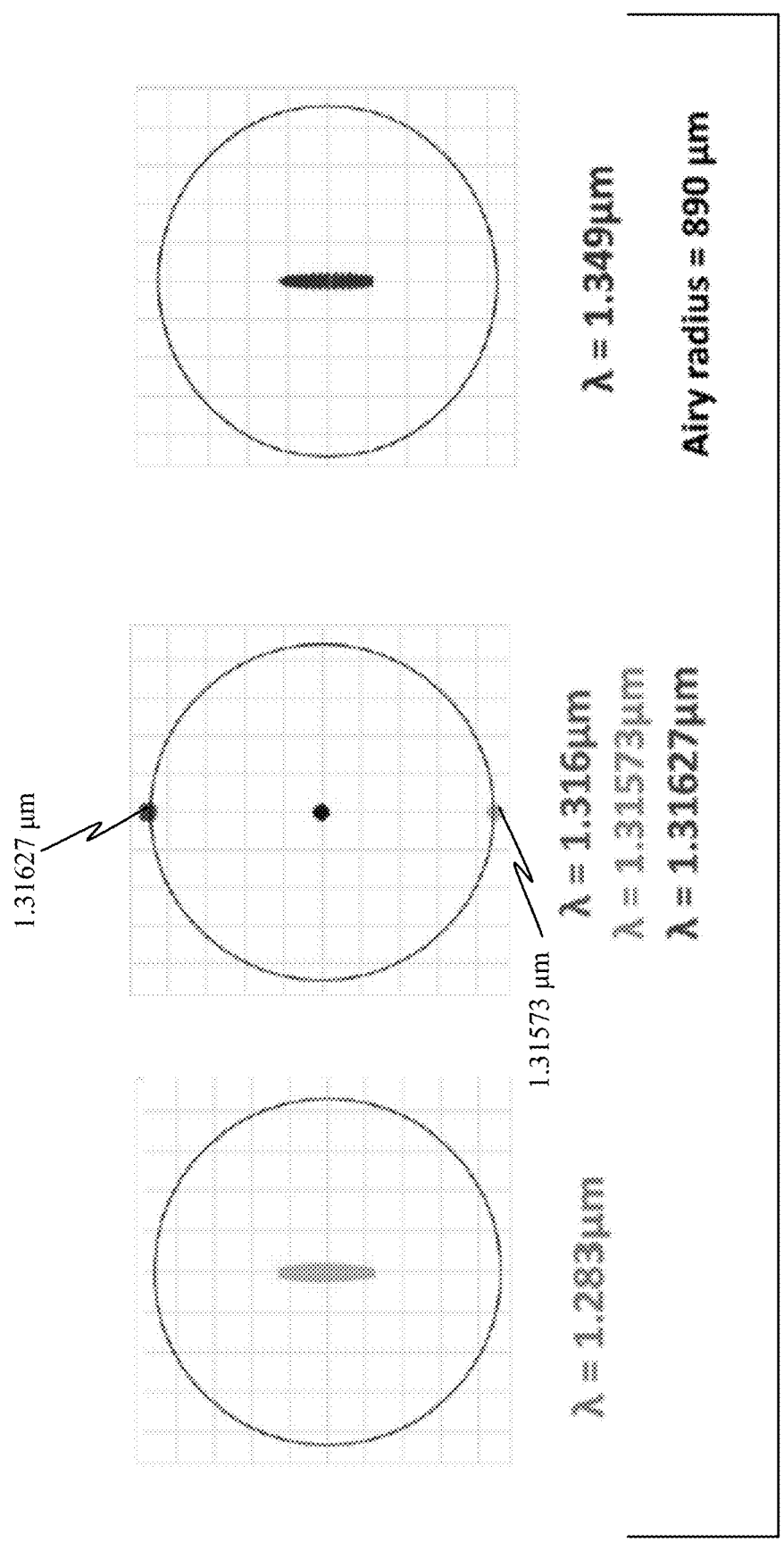
FIG. 7 shows spot diagrams for an example prototype.

FIG. 7 shows spot diagrams for an example prototype. Referring to FIG. 7, the spot diagrams are shown at the imaging plane of the first (e.g., 1.283 μm), central (e.g., 1.316 μm), and last (e.g., 1.349 μm) wavelengths. The central spot diagram, which shows the central wavelength also shows that two additional wavelengths (e.g., 1.31573 μm and 1.31627 μm) have centroids of spots located adjacent to the central wavelength with a separation distance of the Airy radius at the focus. The reflective collimator and lens configuration enabled the centroids of the spots to be within a diameter of a single airy disk as shown in the central spot diagram.

For processing an interferogram, if the point spread functions of two adjacent wavelengths are unresolvable (i.e., the centroid of the spot of one wavelength is within the Airy diameter of the other wavelength such as illustrated in FIG. 7), the detected signals from these two wavelengths were treated as arising effectively from the same position, and were therefore analyzed within the same spectral window.

As such, for the prototype, the optimal spectral window size of 1.56 cm-1 in wavenumber or 0.27 nm in wavelength was determined for the design, which corresponded to about 200 samples per window. The effective lateral resolution of the system along the grating axis was then determined by the sum of point-spread functions (PSFs) of all the wavelengths within the same spectral window, which is equivalent to the convolution of the PSF of single wavelength and the STFT window. Thus, the lateral resolution along the grating axis was determined to be 1240 μm in this design, while the lateral resolution along the galvanometer axis was still 890 μm, determined solely by the imaging optics as in conventional optical imaging.

Here, during processing the interferogram, the truncated signal from each spectral window (see window in box (a) of FIG. 2B) was zero-padded to 5000 samples before taking the Fourier transform (FT) (result shown in box (b) of FIG. 2B). Here, zero-padding enabled more accurate, sub-pixel peak localization. The depth of the dominant reflector was then localized if the peak intensity after taking the FT was above a predefined threshold (see box (b) of FIG. 2B), otherwise that pixel was considered as background with no detected reflector and the depth value was assigned to not available (N/A). To achieve Nyquist lateral sampling, two adjacent spectral windows were overlapped by one half the window size (see e.g., box (a) of FIG. 2B), which was 100 samples or 0.78 cm-1 in wavenumber. Therefore, a total of 475 spectral windows were applied in each frequency sweep/A-scan, which means 475 depth measurements (238 independent depth measurements) were obtained within a single sweep time of 62.7 μs. A depth map was acquired by scanning the beam in the slow axis using the galvanometer mirror, and performing the same STFT and peak localization analysis for each laser frequency sweep. The resulting depth maps can be displayed (see e.g., FIGS. 14A, 14B, 15A, 15B, and 16 described below).

Figure 8:
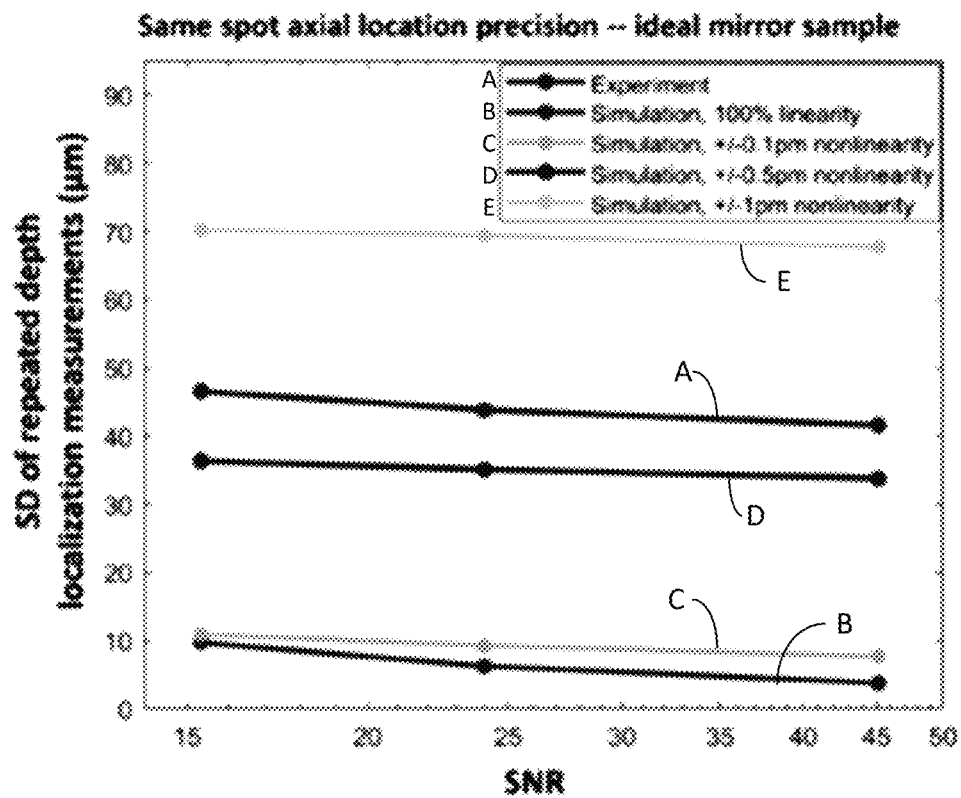
FIG. 8 shows a plot illustrating axial localization precision on an ideal mirror sample.

FIG. 8 shows a plot illustrating axial localization precision on an ideal mirror sample. To quantify the axial localization precision for an ideal reflecting sample, a gold mirror was imaged behind neutral density filters with various optical densities (ODs), which is a standard experiment in optical coherence tomography (OCT) to characterize axial resolution and sensitivity. Data was taken from 400 repeated laser frequency sweeps on the mirror sample without any vertical galvanometer scanning, and the SD of the retrieved depths was calculated at the same location along the horizontal grating scan direction (later referred to as the "same spot" axial localization precision). These measurements were taken at three different input power or SNR levels. Assuming the gold mirror is a perfect single reflector, the normalized interferogram S(k) can be modeled using the following equation, $$S(k)=A\cos(2k\Delta z+\varphi)+\text{Gauss}(0,\sigma) \quad (1)$$

where A and $\varphi$ are amplitude and phase of the interference fringe, and $\Delta z$ is the depth of the reflector. Assuming the system is shot noise limited, in the limit of a large number of photons the noise is approximately normally distributed, Gauss(0, σ), with an SD of σ. Based on this model, the minimum theoretical localization uncertainty of $\Delta z$ has previously been derived, which in practice can be achieved using the aforementioned Fourier-domain zero-padding approach. The SD of the $\Delta z$ localization, $\delta z$, can be estimated using the following equation, $$\delta z \approx (1.6 \times \text{SNR} \times 2\Delta k \sqrt{N_s})^{-1} \quad (2)$$

where $\Delta k$ is the total bandwidth in wavenumber, and $N_S$ is the total number of spectral sampling points. In our system, the number of sampling points, $N_S$, in each STFT window was 200, and the bandwidth of each window, $\Delta k$, was 1.56 cm-1. Here, the SNR of the detected interferogram is defined as $$SNR = \frac{A}{\sqrt{2}\,\sigma}. \qquad (3)$$

Using this equation, the SNRs of the detected interferograms were calculated, and a plot of the SDs of the retrieved depths at three different SNR levels is shown as line A in FIG. 8. Assuming 100% sweeping linearity, the theoretical SDs of depth localization at the same SNR levels as the experimental data are calculated using Eq. 2 and plotted as line B in FIG. 8. The experimental results were compared with the theoretical predicted axial localization precisions at these corresponding SNR levels. As expected, the localization precision increased as the SNR of the detected signal increased (experiment: from 46.5 μm to 41.6 μm; simulation: 9.69 μm to 3.79 μm). However, the measured SDs from the experiment were more than 4× larger than the theoretical SDs.

The model of Eq.2 assumes 100% laser sweeping linearity, such that adjacent spectral sampling points are evenly spaced in wavenumber. To also include the effect of sweeping nonlinearity, the model is extended to include sweep nonlinearity using the following equation $$S(k)=A\cos(2(k+\text{Gauss}(0,\sigma_k))\Delta z+\varphi)+\text{Gauss}(0,\sigma) \qquad (4)$$

Here, Gauss(0, $\sigma_k$) is the gaussian wavenumber nonlinearity noise with a SD of $\sigma_k$. Using this extension to the model, S(k) was simulated with $\Delta z$ the same as the experiment data and various $\sigma_k$ ranging from 0.1 pm (5.8*10$^{-4}$ cm$^{-1}$) to 1 μm (5.8*10$^{-3}$ cm$^{-1}$) at the same SNR levels, which was used to calculate the SD of depth localization. The results are plotted as lines C, D, and E in FIG. 8. The experiment results are closest to the simulation results with ±0.5 pm nonlinearity (line D), which is also the nonlinearity specification provided by the laser manufacturer. Thus, in the prototype system, it is clear that the sweep nonlinearity played a more significant role in determining the same spot axial localization precision in this application.

On the other hand, the OCT axial resolution, defined as the coherence length of the laser over the wavelength sweep range per acquisition, is calculated using the below equation, $$l_c = \frac{2\ln 2}{\pi}\frac{\lambda_0^2}{\Delta\lambda} \qquad (5)$$

where $\lambda 0$ and $\Delta\lambda$ are the central wavelength and the bandwidth of the source, respectively. In the prototype system, the bandwidth of each STFT window was 0.27 nm, and the corresponding OCT axial resolution (i.e., coherence length associated with that bandwidth) was 2.82 mm. Meanwhile, the measured localization precisions were 41.6-46.5 μm, indicating that our same spot localization precision for an ideal mirror sample was >60× better than the theoretical axial resolution.

It is noted that for a grating-scanned system with non-telecentric scanning, a mirror or other specularly dominant reflector is useful for comparison with theory, but the results for localization accuracy and precision may differ from real-world diffusely scattering samples since a mirror artificially enforces an exact back-scattering requirement. Therefore, in order to depict real-world performance, diffuse scattering samples were used in additional experiments.

Figure 9:
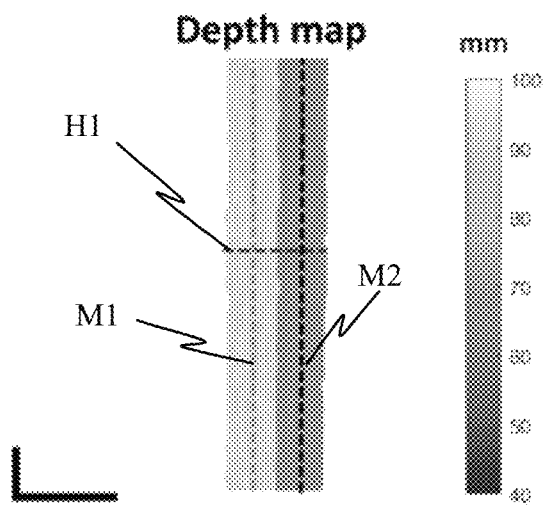
FIG. 9 represents a depth map of two staggered metal base plates.

For example, to characterize any additional contributions to axial localization uncertainty arising from lateral scanning, "scanning spot" measurements were performed using two staggered metal base plates separated by 25.4 mm in depth. FIG. 9 represents a depth map of two staggered metal base plates. For the repeated same spot measurement of the diffusely scattering anodized aluminum sample (depth map shown in FIG. 9), the SD of depth localization at a single lateral position on the sample was 64.2 μm.

For this experiment, the depth profiles were measured (with corresponding plot shown in FIG. 10A) along the two lines M1 and M2 shown in FIG. 9 in the galvanometer scan direction of the front and back metal plates. FIGS. 10A and 10B show plots of depth profiles and a difference profile, respectively, of the two staggered metal base plates. The scanning spot axial localization precision is defined as the SD of the depth localization from multiple laterally displaced locations along the galvanometer scan direction line, and the scanning spot axial localization accuracy is defined as their depth difference (see FIG. 10B, which shows the difference of the two depth line profiles shown in FIG. 10A to be compared to the ground truth depth difference of 25.4 mm at line GT). This measurement was repeated at five different axial positions (~4, 10, 16, 22 and 28 cm).

Figure 11A:
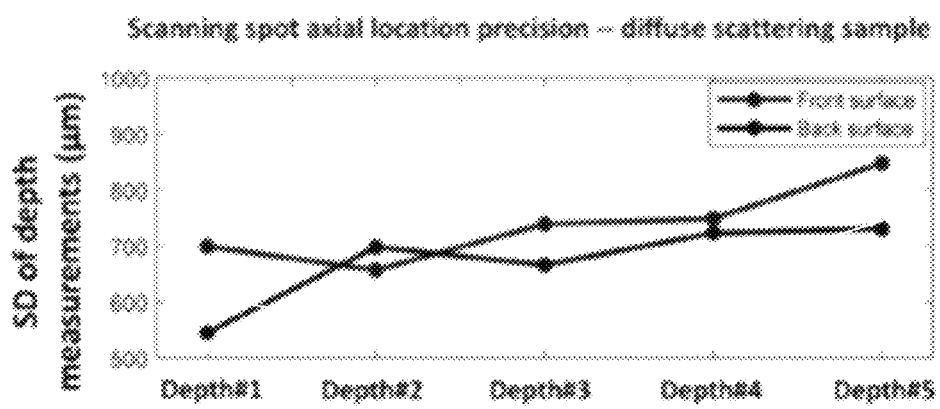
FIGS. 11A and 11B show measurement results characterizing the scanning spot axial localization precision and accuracy for the two staggered metal base plates.
Figure 11B:
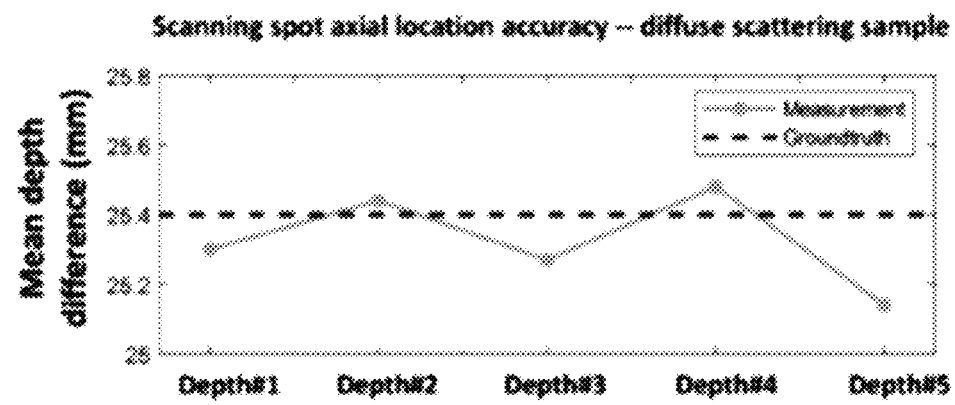

FIGS. 11A and 11B show measurement results characterizing the scanning spot axial localization precision and accuracy for the two staggered metal base plates. Referring to FIGS. 11A and 11B, the axial localization accuracy results were measured at the five different depths (~4, 10, 16, 22 and 28 cm) using the staggered metal plate sample (formed of anodized aluminum). The SDs of depth localization obtained from 100 different positions at the front surface and the back surface along the two lines M1 and M2 shown in FIG. 9 are plotted in FIG. 11A, and, as shown in FIG. 11B, the mean measured depth differences at five different depths were 25.30 mm, 25.44 mm, 25.27 mm, 25.48 mm and 25.14 mm, which were all close to the ground truth, 25.40 mm. Interestingly, the SDs of the scanning spot depth localization measurements across the metal sample (~500-800 μm) were ~7-11× larger than the SD of the same spot depth localization at a single lateral position in the same metal sample (64.2 μm). Since the surface roughness of these professionally machined surfaces is expected to be substantially less than 0.5 mm, this difference is likely due to independent realizations of speckle as a function of lateral position arising from the distribution of sub-resolution reflectors in the diffusely scattering sample, including those below the surface. Nevertheless, even for this real-world sample, the measured axial localization precision still exceeded the theoretical OCT axial resolution, given the laser bandwidth used to obtain the depth measurement, by ~4×. It is noted that scanning spot precision and accuracy are sample dependent. The values are expected to be closer to the same spot precision when the sample is more like a specular reflector (i.e., a dominant single reflector with minimal surface roughness).

The lateral localization precision of the system was characterized by imaging the same staggered metal plates and quantifying the uncertainty of the edge localization. FIGS. 12A-12C illustrate lateral localization precision. FIG. 12A shows a plot of an edge response function; FIG. 12B shows a depth range measurement; and FIG. 12C shows a plot representing horizontal localization precision. To measure the horizontal localization precision, the edge of metal plates were aligned perpendicular to the grating/horizontal axis, and the depth map was obtained using the same STFT processing method described above, except that for characterization purposes, the depth map was oversampled by having two adjacent STFT windows separated by 10 samples or 0.08 cm-1 in wavenumber. The resulting edge response function is shown in the plot of FIG. 12A along the horizontal axis (line H1 in FIG. 9). The depth range measurement was obtained as the peak of its derivative, as shown in FIG. 12B. This measurement was repeated at 250 consecutive lateral positions along the vertical axis. Referring to FIG. 12C, the peak location profile was fitted with a line to remove the residual tilt due to imperfect alignment of metal plates, and the residual standard deviation was calculated to arrive at the horizontal localization precision. Using the same approach, the vertical localization precision was measured by imaging the same metal base plates rotated by 90 degrees. The base plates were placed at three different lateral positions(center: ~[0,0]cm; edge: ~[+10,0]cm; corner: [+10,+10]cm) and five different axial positions (~4, 10, 16, 22 and 28 cm) to quantify the horizontal and vertical lateral localization precision over the entire 3D imaging space. FIG. 13 shows the horizontal and vertical localization precisions measured using the same staggered metal piece at five depths (~4, 10, 16, 22 and 28 cm) and three different lateral positions (center: ~[0,0]cm; edge: ~[+10,0]cm; corner: [+10, +10]cm). As can be seen, the localization precisions in both directions were uniform across the imaging depth and lateral FOV. The mean and SD of vertical localization precision was 143.2 µm and 24.8 µm, while the mean and SD of the horizontal localization precision was 205.4 µm and 26.7 µm. It was expected that the vertical localization precision would be better than the horizontal localization precision, as the vertical resolution (~890 µm) of the prototype imaging system is better than the horizontal resolution (~1240 µm) due to STFT analysis. Nevertheless, this result demonstrates that the system localized the reflector depth variation laterally better than the optical resolution of the system.

As can be seen from the experimental results, the measured same spot axial localization precision on both mirror and machined metal samples was about an order of magnitude better than the measured scanning spot axial localization precision on the metal sample. Here, the same spot axial localization precision can be considered as the system-limited axial localization precision, since this value only depends on the SNR of the detected signal and sweep linearity of the source as shown above, while the scanning spot localization precision can be considered as the sample-limited axial localization precision, as it includes any additional contributions to axial localization uncertainty arising from sample roughness or other deviations from the single reflector assumptions. It is notable that the sample-limited axial localization precision on the mirror sample could not be measured, since the optical system was not telecentric and thus only a very small central region of the mirror satisfied the exact backscattering requirement. The difference between system-limited and sample-limited localization precisions on the metal sample is likely due to the effects of speckle. Since the adjacent wavelengths in each STFT window are not completely overlapped, and the metal is not a single specular reflector, different wavelengths interact with different sub-resolution reflectors, leading to speckle. With a narrow bandwidth of 0.27 nm, the effect of speckle is even more significant, as also observed in a previous grating-based scanning microscopy system 32. To reduce this effect, besides using a broader bandwidth source and a larger STFT window, methods such as spatial or angular compounding could also be considered.

The current prototype has a relatively short imaging depth range of 32 cm, which is currently limited by the bandwidth of the available photodetector and digitizer. Using a commercially available higher speed digitizer (e.g., 4 G/s), along with a similarly available photodetector with sufficient bandwidth (e.g., >2 GHz), the imaging range of the system could be further extended to more than 1.6 m. An increase of sampling rate would also lead to more sampling points per STFT window, improving the localization precision as predicted by Eq. (3). To further increase the imaging range, it is possible to reduce the sweep rate of the laser with a tradeoff of frame rate.

The horizontal angular FOV is fundamentally determined by the bandwidth of the source and the groove density of the grating. With a 65 nm bandwidth centered at 1316 nm and a 1145 grooves/mm grating, an angular FOV of 7.1° was achieved. To increase the angular FOV, a source with a larger bandwidth or a grating with a larger groove density could be used. Alternatively, without changing the angular FOV, the lateral FOV could also be extended by simply increasing the working distance. It is anticipated that an imaging lens with a longer focal length or even a collimated beam would be used to extend the axial location of the focal plane. A telescope could also be added after the grating to expand the angular FOV. A total of 238 independent depth measurements were obtained within a single sweep with the described prototype setup. To increase the number of independent measurements per sweep without changing the laser and grating, a narrower STFT window can be used, which means a more tightly focused beam with better lateral resolution is needed. However, this will potentially lead to worse axial localization accuracy and precision, as explained in Eq. (3), as well as shorter depth of focus. Therefore, the numerical aperture (NA) of the imaging beam determines the tradeoff between the total number of resolvable measurements along the grating axis and the axial localization precision and depth of focus. The optimal choice of the NA depends on the applications.

Figure 14A:
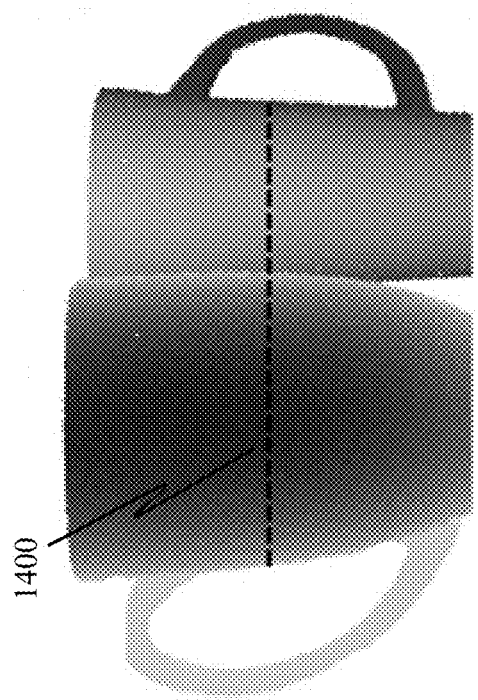
Figure 14B:
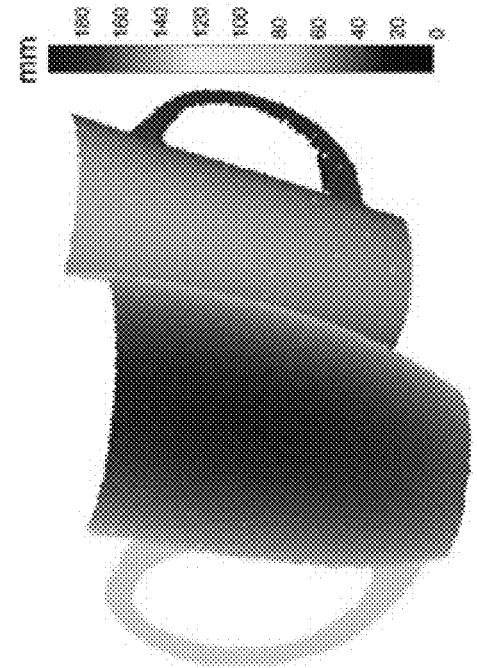
Figure 14C:
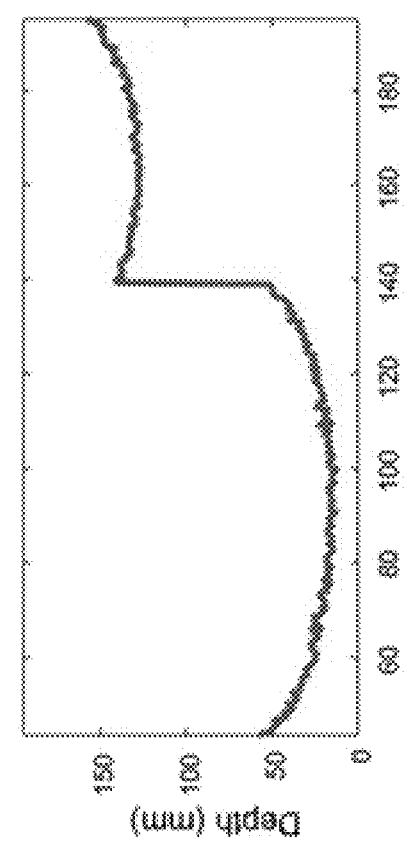
Figure 14D:

Further experiments were performed using the prototype systems. 3D imaging on multiple static samples and a living human hand were performed. FIGS. 14A-14D illustrate an experiment in which two ceramic coffee cups are imaged. Here, to demonstrate the long axial imaging range of the system, two ceramic coffee cups as shown in the photograph of FIG. 14D where imaged. These two coffee cups were axially separated by >9 cm. 1000 scans across a vertical FOV of 15 cm were acquired, which corresponds to a 3D imaging frame rate of 15.94 Hz. The processed depth map with 475*1000 pixels (spanning 22.3×15 cm) and the corresponding 3D rendering of cups are shown in FIGS. 14A and 14B. FIG. 14C shows a plot of the cross-section depth profile along the black line 1400 in FIG. 14A; the contour of the cup can be clearly observed.

Figure 15B:
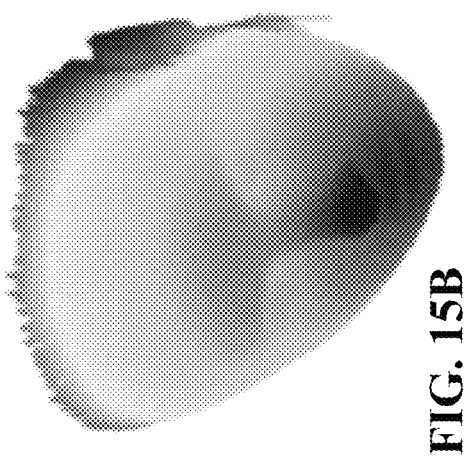
Figure 15D:
Figure 15A:
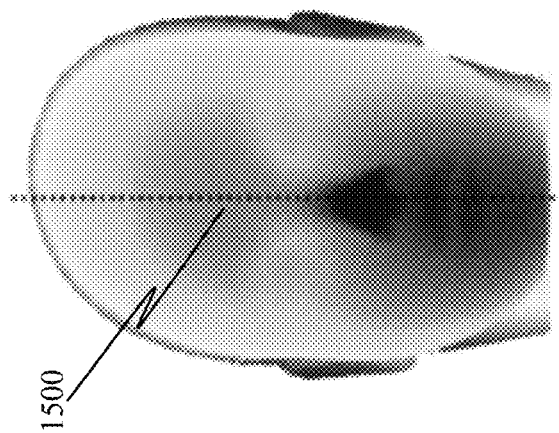
Figure 15C:
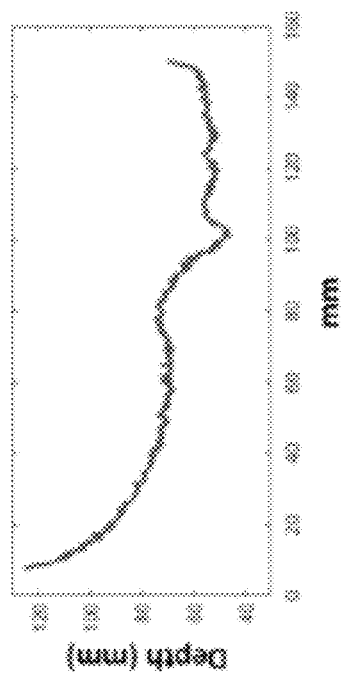

FIGS. 15A-15D illustrate an experiment in which a synthetic rubber mannequin head was imaged. To demonstrate that this technology can image objects with relatively weak surface reflections, a synthetic rubber mannequin head as shown in FIG. 15D was imaged. Similar to the coffee cup imaging of FIG. 14D, 1000 scans across a vertical FOV of 15 cm were acquired, corresponding to the same 3D imaging frame rate of 15.94 Hz. Due to relatively weak scattering signal from the sample, the intensity thresholding-based depth localization approach was not sufficient to localize the depth of every reflector within the sample. Additionally, when a lower threshold value was applied, more background stripe noise was introduced due to imperfect removal of invalid points during the transitions between subintervals of a laser sweep. Therefore, a gradient-based background noise removal algorithm was applied along with a 3*3 median filter to create the final depth map and 3D volume rendering. The representative depth map and the corresponding volume rendering of the head are shown in FIGS. 15A and 15B. FIG. 15C shows a plot of the cross-section depth profile along the black line 1500 in FIG. 15A. The contours of the forehead, nose, upper and lower lip can clearly be resolved.

FIG. 16 illustrates an experiment in which a moving hand is imaged. Referring to FIG. 16, a hand adjacent to a metal stage and actively making a first was imaged to demonstrate that the system is applicable to in vivo imaging of moving objects. 480 scans (including 80 scans for galvanometer flyback) across a vertical FOV of 16 cm were acquired, which corresponds to a frame rate of 33.2 Hz. The final depth maps with 475*400 pixels (spanning 22.3×16 cm) and the corresponding 3D renderings of the hand at different times are shown in FIG. 16. For the depth maps in the top row, the same noise removal method discussed for the face in FIGS. 15A-15D was applied (e.g., applying a gradient-based background noise removal algorithm and median filter to the depth map). For the volume rendering in the bottom row of FIG. 16, to further remove the background stripe noise, an 8*8 median filter was used. Although human skin is a relatively weakly scattering sample, the depth map of skin is still retrieved with high axial localization accuracy.

As can be seen from the above prototype experiments, the time-frequency multiplexed FMCW system achieves high-speed high-precision 3D imaging by using a broadband swept source with narrow instantaneous linewidth and a diffraction grating for spectrally encoded fast axis scanning. By applying a compressed sampling approach using an optimized window size and zero padding, 238 independent depth measurements along the grating axis were obtained within a single sweep time. Although each window had a narrow bandwidth of 0.27 nm, it was demonstrated on both mirror and metal samples that the axial localization accuracy and precision were significantly better the theoretical resolution, which was nearly 3 mm. 3D imaging of multiple static samples and video-rate imaging of a moving human hand demonstrate the great potential of this technology in a wide range of potential applications in the fields of robotics navigation, virtual reality, and 3D printing. Indeed, the system can perform video-rate high-precision 3D and potentially be used in many emerging industrial, automotive, and biomedical fields.

Prototype Using a Conventional OCT Swept Source

In Fourier domain OCT, the Fourier transform of spectral interferogram detected by the spectrometer (spectral-domain OCT) or photodetector (swept-source OCT) results in depth-resolved reflectivity profile at the beam location (A-scan). The axial resolution of OCT is determined by the coherence length of the light source. A larger bandwidth of the source yields a higher axial resolution. For example, a 100 nm bandwidth swept source at 1050 nm will lead to an axial resolution of around 7-8 However, if the sample has a dominant reflector (typically the surface reflector), a much narrower bandwidth is needed to localize the reflector axially with the same level of accuracy.

To determine how much source bandwidth is required at minimum for certain axial localization accuracy, assume a single reflector at the depth $\Delta z$ such that the real-valued spectral interferogram can be expressed as, $y = A\cos(2k\Delta z + \varphi) + \text{Gauss}(0,\sigma)$, where A and $\varphi$ are respectively the amplitude and phase of the interference fringe, k is the wavenumber and Gauss $(0,\sigma)$ is the Gaussian noise with a standard deviation of $\sigma$. Then the marginal maximum a posteriori estimator of $\Delta z$ is the peak location of the Fourier transform, and the uncertainty or standard deviation of peak localization is $$\delta z \approx \left(1.6 \times SNR \times \frac{\Delta k}{2\pi} \sqrt{N_s}\right)^{-1} \tag{6}$$

where $\Delta k$ is the bandwidth, $N_S$ is the number of sampling points, and SNR is defined as $$\frac{A}{\sqrt{2}\sigma}.$$

The SNR can also be defined as $\sqrt{n/2}$ (where n is the total number of detected photons) if the system is shot noise limited. Assume a 0.5 nm bandwidth at 1050 nm with 2 mW of input power at sample, and 0.1% of the input power is backscattered and collected by the photodetector, with an integration time of 0.5 ns (the sampling speed of our digitizer), it is expected that around 4027 photons can be collected, which correspond to a SNR of ~63.4. Assuming a sample of 20 spectral points across the 0.5 nm bandwidth, the uncertainty or standard deviation of peak localization $\delta z = 17.7$ μm. The calculation here is a simplified model that assumes there is only one reflector at a given OCT A-scan. In a more realistic scenario, the sample with a dominant surface reflector still contains multiple weak reflectors under the surface reflector. To further understand the axial localization accuracy of this method, the following simulation experiments using the conventional OCT data were performed.

The 100 kHz swept source OCT system collected 2752 spectral points across the whole ~100 nm bandwidth in a single sweep. Instead of using all 2752 spectral points to compute OCT images, 20-100 spectral points were used, which corresponds to a bandwidth of 0.73-3.63 nm, and a theoretical OCT axial resolution of ~150-700 μm. The subsampled spectral signal was zero-padded, and then the depth was estimated by localizing the peak of the Fourier transform of the signal. To obtain the ground truth depth positions, the corresponding regular OCT A-scan was processed using all 2752 spectral points and the surface depth was localized. The simulation studies were conducted on both a metal and an in vivo human skin dataset.

In spectroscopic OCT, the time-frequency analysis has an internal tradeoff between the axial resolution and spectral resolution. Here, since a grating distributed a spectral sweep along one lateral axis, which means the axis is spectrally encoded, the system essentially has a tradeoff between depth and lateral resolution (as discussed with respect to the prototype experiments above). The spectral resolution of the time-frequency multiplexing 3D camera is similar to a conventional spectrometer, which has the spectral resolution of the system determined by the following equation:

$$\delta\lambda = \frac{\lambda}{R} = \frac{\lambda^2}{W(\sin I + \sin D)}, \tag{7}$$

where $\delta\lambda$ is the spectral resolution, R is the grating resolving power, W is the beam diameter, and I and D are the incident and diffracted angle, which depend on the groove density (grooves/mm). Except the groove density, as can be seen from this equation, a larger input W beam onto the grating will lead to a better spectral resolution. A large input beam W means a larger NA of the focusing beam, which means a smaller beam spot at the focus and a better spectral resolution.

The designed spectral resolution of the system also determines the window size of the time-frequency analysis, as it can be desirable to have all the spectral points within the same to match the spectral resolution of the system, which means all the spectral points within the window are from the same lateral resolvable spot at the imaging plane.

For the prototype that used a 1050 nm swept source, the spectral resolution as a function of the beam width was plotted at three different grating configurations (600, 800 and 1200 grooves/mm) and the central wavelength of 1050 nm using Eq. 7 (see FIG. 17). The OCT system has a spectral sampling resolution of ~0.036 nm (2752 spectral points across 100 nm bandwidth). For example, assuming 20 spectral points are needed for each lateral location to perform depth localization, a spectral resolution of ~0.7 nm can be achieved by using an input beam diameter of around 2.5 mm and a grating with a groove density of 600 grooves/mm (see line labeled as GD in FIG. 17).

FIG. 18 shows a design of time-frequency multiplexing 3D camera with a zoom-in view of the imaging plane where different wavelengths of a single sweep were distributed to the different lateral location along one axis. The prototype design has a 2 mm input beam and a 600 grooves/mm grating. The design was simulated using software by Zemax LLC to confirm the spectral resolution and field of view (FOV). The grating is placed at one focal length away from an imaging lens with f=100 mm to create a telecentric imaging plane as shown in FIG. 18. Different wavelengths of a single sweep were distributed to the different lateral location along one dimension. FIG. 19 shows spot diagrams for a prototype using a conventional OCT swept source. Referring to FIG. 19, the spot diagrams are shown (from left to right) at the starting wavelength of the sweep (1000 nm), three adjacent wavelengths (1049.8 nm, 1050 nm and 1050.2 nm), and the ending wavelength of the sweep (1100 nm). Airy radius=63 μm. The spot diagrams at the starting wavelength (1000 nm) and the ending wavelength (1100 nm) are shown with a single wavelength. The FOV of the system can then be determined to be approximately 6.2 mm and the lateral resolution of the system is about 62 μm. The center spot diagram shows the overlapped three spot diagrams from 1049.8 nm (green), 1050 nm (blue) and 1050.2 nm (red), to demonstrate that the beam locations across a bandwidth of 0.4 nm are significantly overlapped and unresolvable, which agrees with the calculation above.

FIG. 20A shows a design of the time-frequency multiplexing 3D camera using the diffraction grating for fast-axis scanning and the galvanometer mirror for slow-axis scanning; and FIG. 20B shows a zoom-in view of the imaging plane for FIG. 20A. To achieve 3D imaging, a galvanometer mirror was placed at a conjugate plane before the diffraction grating formed by a pair of f=100 mm achromatic doublets and used to perform orthogonal axis scanning (FIGS. 20A and 20B). In summary, the fast axis scanning was controlled by the grating, while the slow axis scanning was controlled by the galvanometer scanner.

To retrieve the depth information from the detected spectral interferogram, the time-frequency analysis was performed. Here, for the 1050 nm conventional OCT swept source system, the STFT analysis was performed with a Hamming window function and a window size of 20 spectral points, which corresponds to a bandwidth of approximately 0.73 nm. This bandwidth is also close to the designed spectral resolution of the system (0.7 nm). To achieve the Nyquist sampling, two adjacent windows are overlapped by half of the window size, 10 spectral points, which leads to the total number of windows across one sweep to be 237.

FIGS. 21A-21C illustrate an experiment using the conventional OCT swept source on a metal piece and human skin. FIGS. 21A and 21B show single OCT B-scans of a metal piece (FIG. 21A) and human skin (FIG. 21B) with the blue line representing estimated depth calculated using only 20 spectral points (0.73 nm bandwidth) and the red line representing ground truth surface depth calculated using all 2752 spectral points (100 nm bandwidth). FIG. 21C shows a plot of the standard deviation between estimated and ground truth depth (axial localization accuracy) as a function of spectral points. The standard deviation between estimated and ground truth depth was calculated as a function of spectral points used across a total of 576 A-scans. Although human skin as a biological sample has a much weaker surface reflection, it was demonstrated that it is possible to still achieve <70 μm depth sensing using only 40 spectral points.

As demonstrated, to localize the depth of a dominant reflector in OCT, a much smaller bandwidth is actually needed. Here, it can be seen that when only 20-100 spectral points of a sweep were used for analysis, which corresponds to a bandwidth of 0.73-3.63 nm and a theoretical OCT axial resolution of ~150-700 it is possible to localize the depth of the dominant reflector with an accuracy much better than the theoretical OCT axial resolution. It can also be seen that the depth of a metal sample surface can be localized with an accuracy of <35 μm using only 20 spectral points (~0.73 nm bandwidth) and human skin surface with an accuracy of <70 μm using only 40 spectral points (~1.46 nm bandwidth).

Figure 22A:
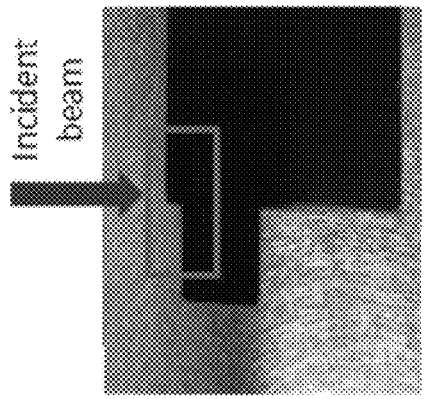
Figure 22B:
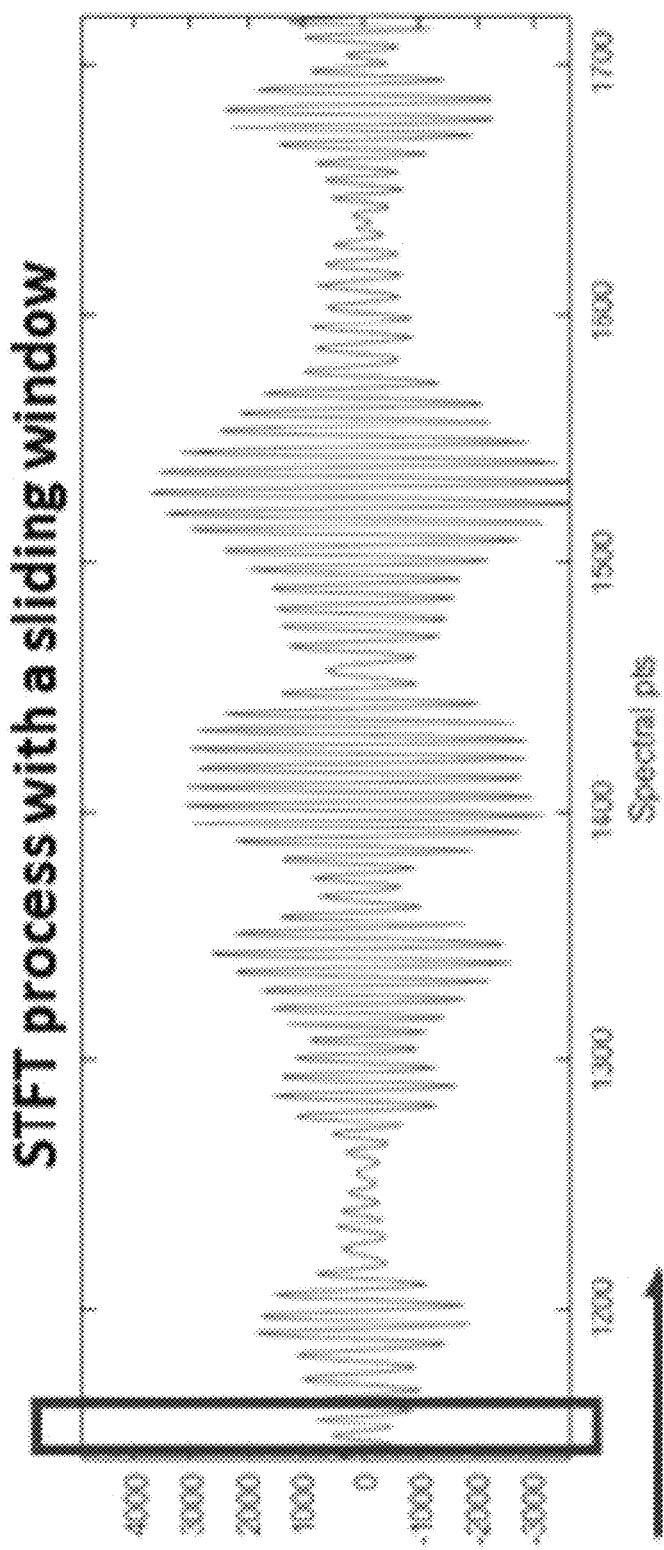
Figure 22C:
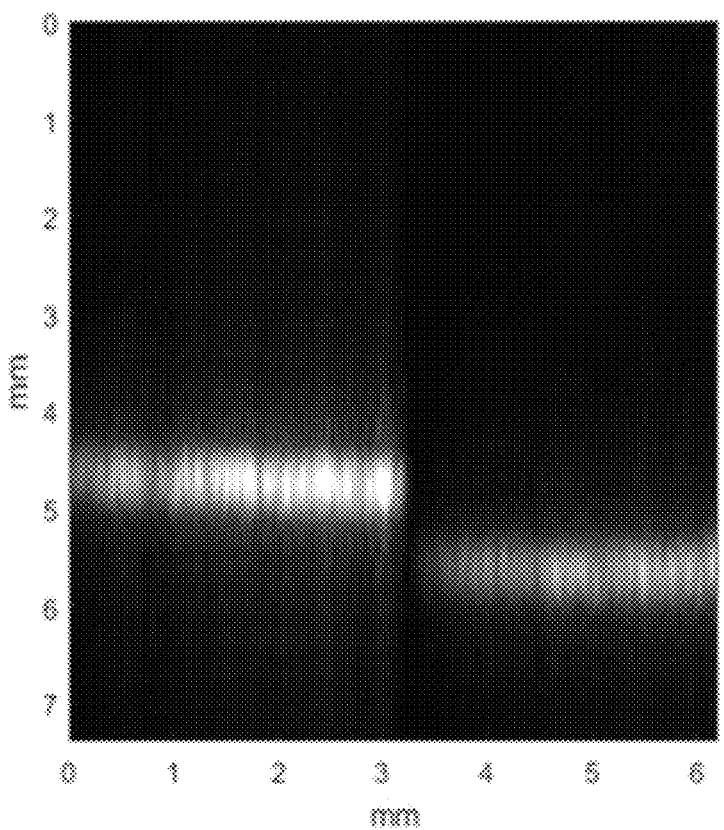
Figure 22D:
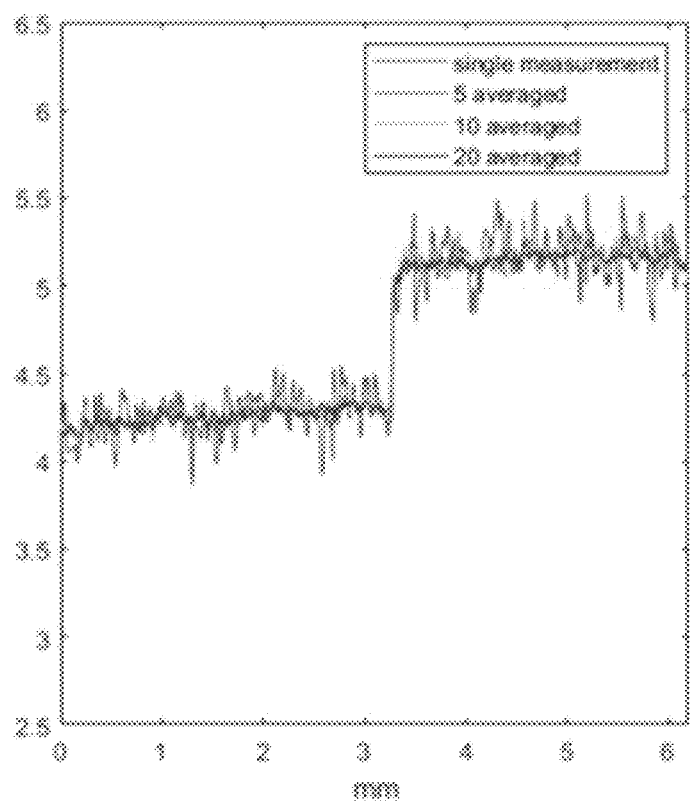

FIGS. 22A-22D illustrate an experiment using the conventional OCT swept source on a metal piece. Some preliminary testing of the prototype was carried out by imaging the depth of a metal piece. The picture of the metal piece is shown in FIG. 22A. The arrow indicates the incident beam direction. STFT analysis was performed on the detected spectral interferogram with a sliding window and a window size of 20 spectral points (~0.73 nm). There is still a difference between the data collected using the prototype and the simulated data using conventional OCT. In conventional OCT, the beam is considered to be extremely stationary for each A-scan, as the laser sweep rate is much faster than the galvo mirror scanning speed; while in the prototype, although the beam spots between adjacent wavelengths were designed to be significantly overlapped, there was still a slight lateral shift of the beam spot. Therefore, the sub-resolution reflector profiles within the beam spot were also slightly modified, which meant beam spots of two adjacent wavelengths contained different speckle information. This speckle effect can reduce the accuracy of the depth localization measurement. One simple approach to reduce the speckle effect is to perform spatial compounding/averaging. Here, slow axis scanning was performed using the galvo mirror and the averaged depth profile was calculated using the adjacent scans. FIG. 22B shows a representation of the STFT process with a sliding window. The 20-averaged STFT image of the metal piece is shown in the FIG. 22C, and the localized surface depth profiles of this metal piece with 1, 5 averaged, 10 averaged, and 20 averaged measurements are shown in FIG. 22D. As mentioned, the standard deviation of the localized depths was calculated at each surface to estimate the depth sensing accuracy. A depth sensing accuracy of <300 μm is achieved with single measurement, and a depth sensing accuracy of <100 μm is achieved with more than 10 averaged measurements. For the comparison purpose, the conventional OCT system with the same bandwidth (0.73 nm) has only approximately ~1 mm axial resolution. More importantly, a single depth measurement shown in FIG. 22D only took 10 µs to acquire. Assuming 500 lateral positions along the orthogonal axis were obtained by scanning the galvanometer mirror, a 237*500 3D image with a frame rate of 200 Hz can be achieved.

As mentioned above, the imaging depth of this system using conventional OCT swept source is limited by the coherence length of the laser (~6 mm), which restricts the samples that can be imaged. Nevertheless, it was demonstrated that this time-multiplexing 3D camera prototype can acquire 3D image of a sample with a depth sensing accuracy of <300 µm and a frame rate of 200 Hz.

Prototype B Using Akinetic Swept Laser Source

For the prototype B, an akinetic swept laser was used (for an early demonstration of a long coherence length swept source). The laser has a coherence length of at least 220 mm and a central wavelength of 1310 nm. Moreover, both the bandwidth and sweeping rate of the laser can be adjusted from ~5 nm to 70 nm and from ~5 kHz to 400 kHz. In this application, the sweeping rate of the source was set at 16 kHz and the bandwidth was set at 70 nm.

With a sampling rate of 800 MHz, a total of 48891 spectral points can be acquired within a sweep. The maximum axial imaging range is ~16 cm, limited by the bandwidth of the balanced photodetector (here 400 MHz).

FIG. 23 illustrates a schematic of an example sample arm optical design for a prototype using a long coherence length swept source. To have the depth of focus of the imaging system comparable to the axial imaging range, 16 cm, as well as maximizing the lateral FOV, a non-telecentric imaging system was designed and built, as shown in FIG. 23, which is similar to the design shown in FIG. 5. The system shown in FIG. 23 achieves a lateral spot size of 192 µm, a FOV of ~40 mm and a working distance (from the grating to the imaging plane) of 67.1 cm.

FIG. 24 shows representative details of a design of FIG. 23. In particular, FIG. 24 shows a design of the non-telecentric time-frequency multiplexing 3D camera using the diffraction grating for fast-axis scanning and the galvanometer for slow-axis scanning. FIG. 25 shows spot diagrams of the prototype using a long coherence length swept source. Referring to FIG. 25 the spot diagrams are shown at the starting (1275 nm), central (1310 nm) and ending (1345 nm) wavelength of the sweep; Airy radius=192 µm.

For the long imaging range akinetic source system, a window size of 300 spectral points, which corresponds to a bandwidth of 0.43 nm, was used. Similarly, two adjacent windows are overlapped by half of the window size, 150 spectral points, which leads to the total number of windows across one sweep to be 326. Each subsampled spectral signal was zero-padded to 10,000 sampling points and estimated the depth by finding the peak location of the Fourier transform of the signal.

FIGS. 26A-26D illustrate an experiment in which a stack of five metal pieces is imaged. FIG. 26A shows the STFT processed image of the cross-section of a stack of five metal pieces with a single measurement; FIG. 26B shows the localized surface depth profile; FIG. 26C shows the top view and FIG. 26D shows the front view of the metal stack. Here, the stack of five metal pieces spans a depth range of more than 6 cm. The STFT processed image of the cross section (line M3 in FIG. 26D) of the sample with a single measurement is shown in FIG. 26A, along with its localized depth profile shown in FIG. 26B. The top and front view of the sample are shown in FIG. 26C and FIG. 26D. Assuming each metal surface is flat, the standard deviation of the localized depth profile was calculated at each surface, which is an estimation of the depth sensing accuracy of the system. The mean standard deviation across all five surfaces is 424 µm, which is about 30% larger than the standard deviation obtained from the OCT swept source system (~300 µm). The increased standard deviation is mainly due to 1) The bandwidth at each lateral position is smaller due to the total bandwidth of the laser has a narrower bandwidth (~70 nm at 1310 nm) compared to the conventional OCT swept source (100 nm at 1050 nm) and 2) The metal surfaces may not be placed exactly perpendicular to the incoming beam.

Here it was demonstrated that the prototype can acquire the depth profile of a cross-section with 324 laterally sampling points at a rate of ~16 kHz and a depth sensing accuracy better than 424 µm. The 3D image of the sample was acquired by scanning the slow-axis galvanometer mirror.

Figure 27B:
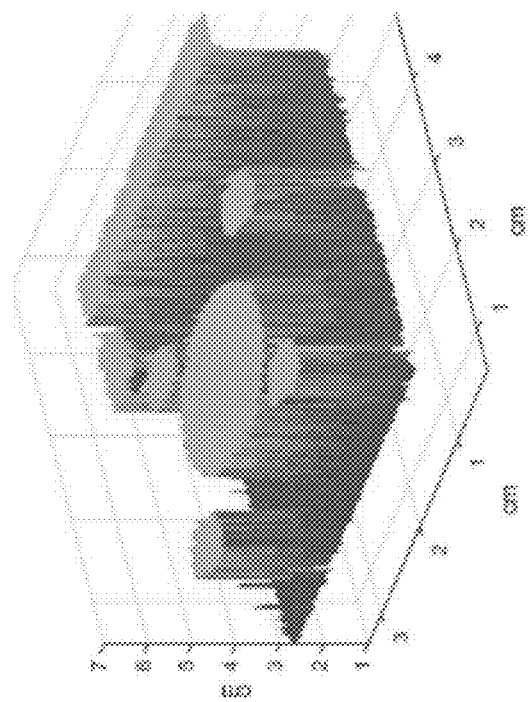
Figure 27D:
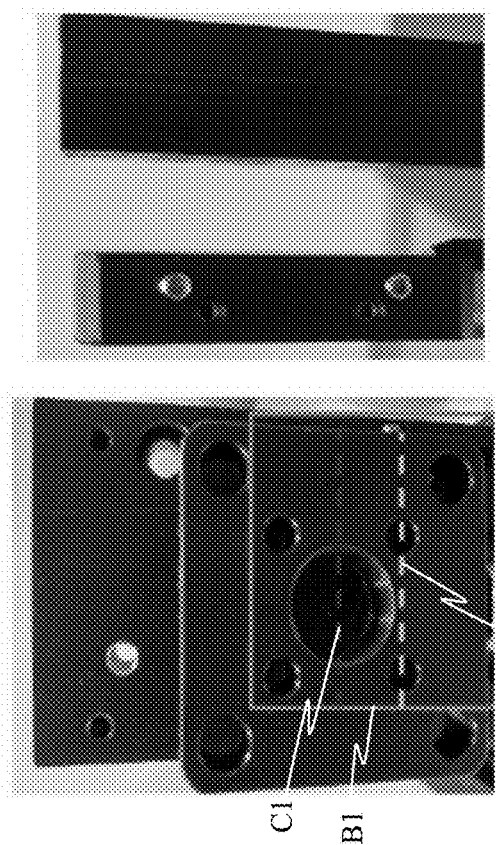
Figure 27A:
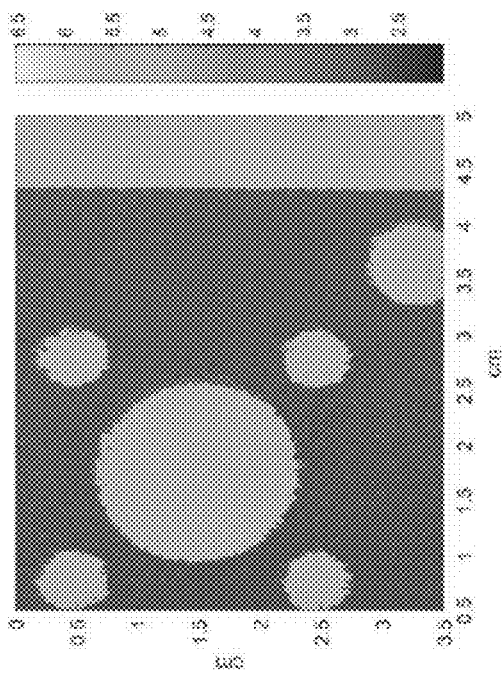
Figure 27C:
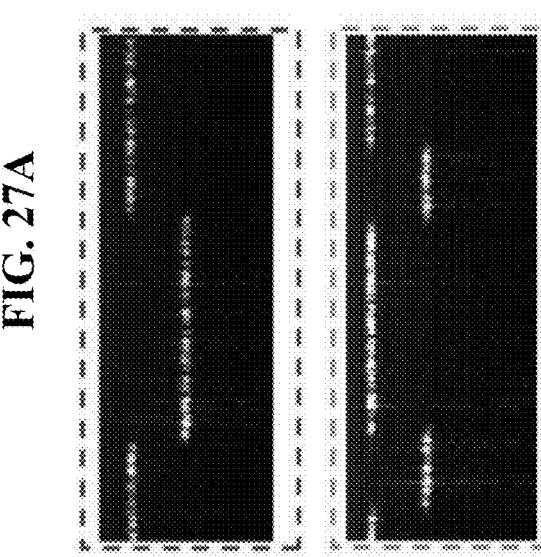

FIGS. 27A-27D illustrate an experiment in which a cage plate is imaged. FIGS. 27A and 27B show a depth map (FIG. 27A) and the 3D surface plot (FIG. 27B) of a cage plate. FIG. 27C shows two STFT processed images of the cross-sections (corresponding to C1 and C2 lines in FIG. 27D) of the sample. FIG. 27D shows the top view and the side view of the cage plate and the metal plate. Here, the cage plate was placed in front of a metal. The top and side view of the sample are shown in FIG. 27D. The extracted depth map and 3D mesh surface plot of the sample (box B1 in FIG. 27D) is shown in FIGS. 27A and 27B. Two representative STFT processed images of the cross sections (lines C1 and C2 in FIG. 27D) are shown in FIG. 27C. The depth map has 324*600 pixels and a frame rate of ~28 Hz.

Figure 28B:
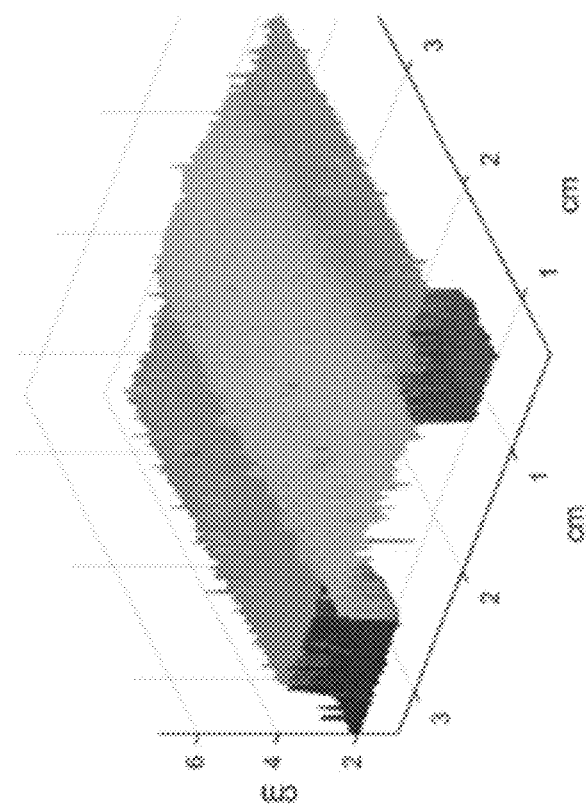
Figure 28D:
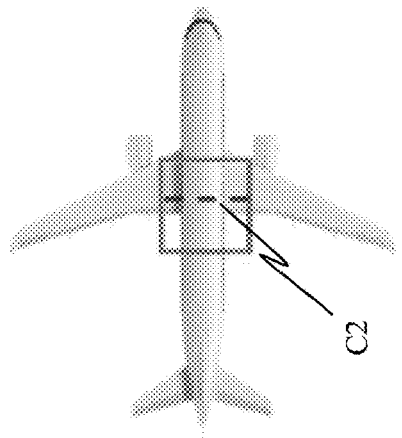
Figure 28A:
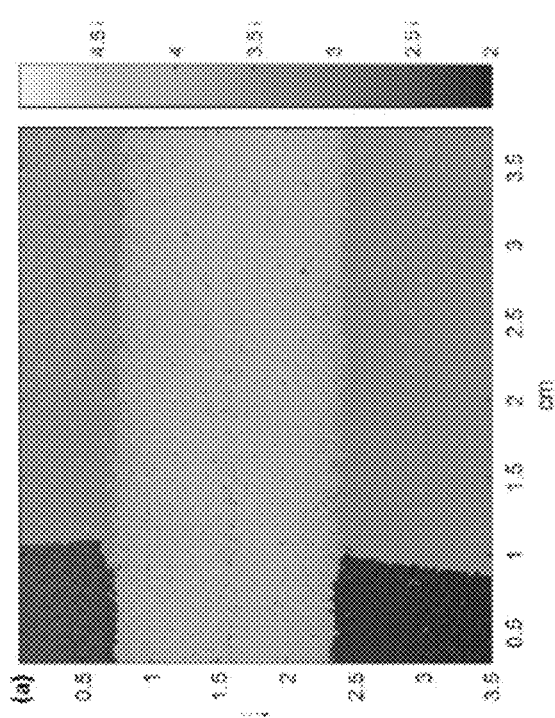
Figure 28C:

FIGS. 28A-28D illustrate an experiment in which a model airplane is imaged. FIGS. 28A and 28B show the depth map (FIG. 28A) and the 3D surface plot (FIG. 28A) of an airplane model of the Airbus 350-900. FIG. 28C shows a STFT processed image of the cross-section (C3 line in FIG. 28D) of the plane. FIG. 28D shows the top view of the airplane model. The depth map has 324*500 pixels and a frame rate of ~33.4 Hz.

Figure 29B:
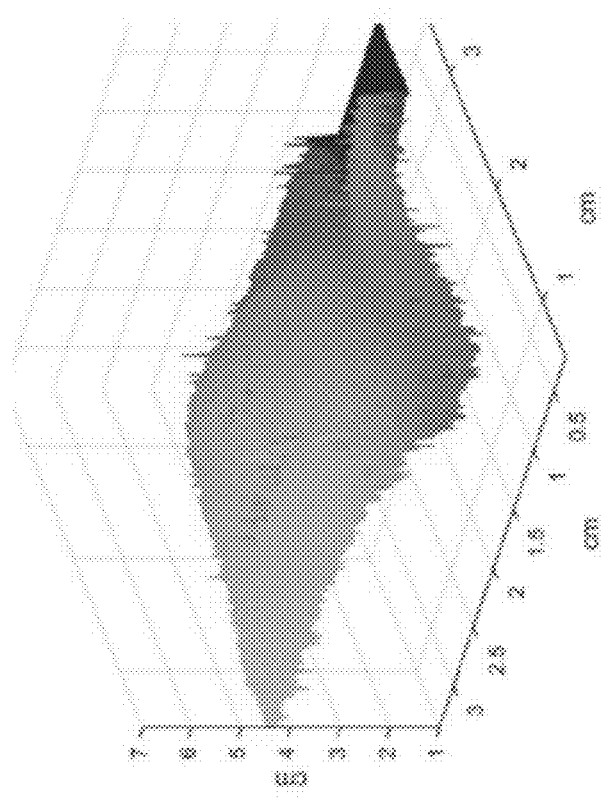
Figure 29D:
Figure 29A:
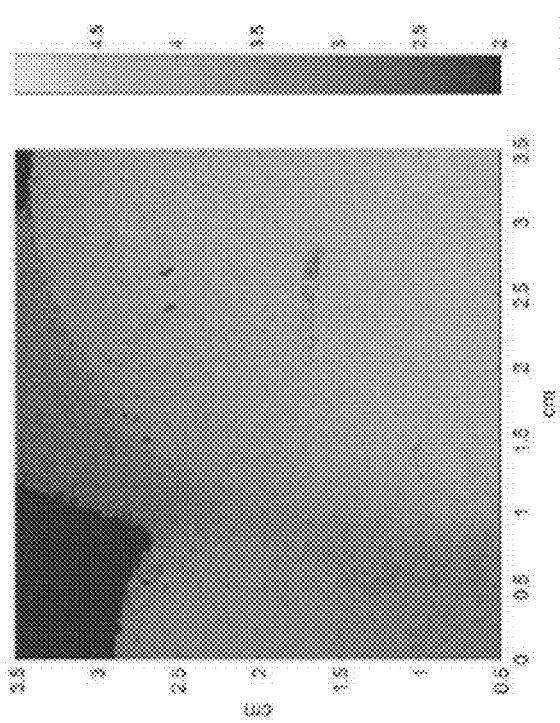
Figure 29C:
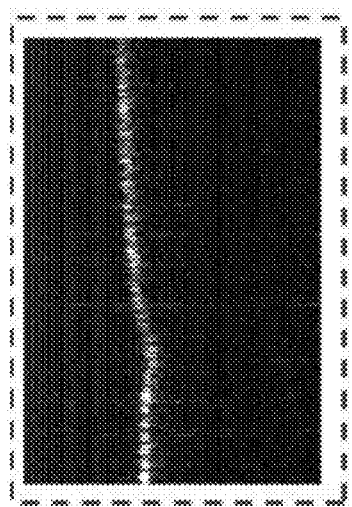

FIGS. 29A-29D illustrate an experiment in which a Japanese ceramic cat coin bank is imaged. FIGS. 29A and 29B show the depth map (FIG. 29A) and the 3D surface plot (FIG. 29B) of the ceramic cat coin bank. FIG. 29C shows a STFT processed image of the cross-section (red dashed line in FIG. 29D) of the sample. FIG. 29D shows the front and top view of the cat coin bank. The depth map has 324*500 pixels and a frame rate of ~33.4 Hz.

As can be seen, the described system provides high speed, high resolution 3D imaging.

Articles "a" and "an" are used herein to refer to one or to more than one (i.e., at least one) of the grammatical object of the article. By way of example, "an element" means at least one element and can include more than one element.

"About" and "around" is used to provide flexibility to a numerical value or a numerical range endpoint by providing that a given value may be "slightly above" or "slightly below" the value or endpoint without affecting the desired result.

The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Moreover, the present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Unless otherwise defined, all technical terms used herein have the same meaning as commonly understood by one of ordinary skill in the art to which this disclosure belongs.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system for 3D depth sensing, comprising:
   a light source that produces a light across frequencies from a first frequency to a last frequency;
   a beam splitter system that is disposed to split the light from the light source into at least a reference beam and a sample beam;
   a sample arm structured to receive the sample beam from the beam splitter system and return a return sample beam, the sample arm comprising a scanner for beam scanning in a first axis and a diffractive optical element for spectrally encoded scanning along a second axis;
   a detector that is disposed to collect an interference signal between the reference beam and the return sample beam returning from the sample arm, the interference signal forming an interferogram, wherein for each frequency sweep across the frequencies from the first frequency to the last frequency, the interferogram comprises depth information at a different position along the second axis; and
   a processing system coupled to the detector, the processing system comprising a hardware processor and a memory storing instructions that when executed by the hardware processor direct the processing system to:
   receive the interferogram of each frequency sweep across the frequencies from the first frequency to the last frequency from the detector;
   for each interferogram, apply a windowed spectral estimator at a particular spectral window size with zero-padding and according to a specified lateral sampling approach, wherein the spectral window size is based on a lateral resolution of the system such that if a point spread function of two adjacent wavelengths are unresolvable, detected signals from the two adjacent wavelengths are treated as arising from a same position and are analyzed within a same spectral window, by:
      sampling the interferogram according to the specified lateral sampling approach; and
      for each spectral window sample of the interferogram, applying zero-padding to a particular number of samples and applying a spectral estimator to the zero-padded spectral window sample to generate a signal for a pixel; performing peak localization analysis on the signal to identify a dominant peak; and if the dominant peak is identified, assigning a depth value according to a corresponding depth position of the dominant peak for the pixel, otherwise, assigning the pixel as a background; and
   provide a depth map of the pixels comprising the assigned depth values.

2. The system of claim 1, wherein the sample arm further comprises sample beam shaping optics.

3. The system of claim 2, wherein the sample beam shaping optics and diffractive optical element are configured to direct the light comprising each spectral window of the light source on or within a diameter of single Airy disk.

4. The system of claim 2, wherein the sample beam shaping optics comprise:
   a collimator that directs the sample beam to the scanner; and
   a lens to focus the sample beam.

5. The system of claim 1, wherein the specified lateral sampling approach comprises a Nyquist lateral sampling.

6. The system of claim 1, wherein the spectral window size is between 0.01 nm and 1.0 nm in wavelength, a lateral resolution along the second axis is between 0.1 mm and 10 mm and a lateral resolution along the first axis is between 0.1 mm and 10 mm.

7. The system of claim 1, wherein each spectral window sample includes a truncated signal of the interferogram, wherein the particular number of samples for zero-padding is 1000-10,000 samples.

8. The system of claim 1, wherein the windowed spectral estimator is a short-time Fourier transform.

9. The system of claim 1, wherein the dominant peak is identified as a highest peak above a predetermined threshold.

10. A sample arm for 3D depth sensing, comprising:
    a collimator for collimating a received sample beam from a light source,
    a scanner for beam scanning of the sample beam in a first axis,
    a lens for collimating or focusing the sample beam, and
    a diffractive optical element for spectrally encoded scanning along a second axis, wherein the collimator, lens, and diffractive optical element are configured to direct light comprising each spectral window of the light source on or within a diameter of single Airy disk.

11. The sample arm of claim 10, wherein the diffractive optical element comprises a transmissive grating.

12. The sample arm of claim 10, wherein the collimator is a reflective collimator.

13. The sample arm of claim 10, wherein the lens is disposed between the scanner and the diffractive optical element.

14. A method of generating a depth map, comprising:
receiving an interferogram;
sampling the interferogram according to a specified lateral sampling approach to obtain a spectral window sample;
for each spectral window sample of the interferogram:
applying zero-padding to a particular number of samples, and
applying a spectral estimator to the zero-padded spectral window sample to generate a signal for a pixel for a 2D scene;
identifying a dominant peak for at least one spectral window sample by performing peak localization analysis on the signal for the pixel of that at least one spectral window sample, and assigning a depth value to the pixel of that at least one spectral window sample according to a corresponding depth position of the dominant peak for the pixel of that at least one spectral window sample;
assigning a background depth value to the pixel of at least one other spectral window sample, the at least one other spectral window sample having no identified dominant peak;
providing a depth map of the pixels, the depth map comprising the assigned depth values and the assigned background depth values for each pixel in the 2D scene; and
applying a gradient-based background noise removal algorithm and median filter to the depth map.

15. The method of claim 14, wherein the spectral estimator is a Fourier transform.

16. The method of claim 14, wherein a spectral window size of the spectral window is based on a lateral resolution of a system providing the interferogram such that if a point spread function of two adjacent wavelengths are unresolvable, detected signals from the two adjacent wavelengths are treated as arising from a same position and are analyzed within a same spectral window.

17. The method of claim 14, wherein each spectral window sample includes a truncated signal of the interferogram, wherein the particular number of samples for zero-padding is 1000-10,000 samples.

18. The method of claim 14, further comprising rendering a 3D image from the depth map.

\* \* \* \* \*